(12) United States Patent
Tanabe et al.

(10) Patent No.: US 11,065,586 B2
(45) Date of Patent: *Jul. 20, 2021

(54) POROUS SUPPORT-ZEOLITE MEMBRANE COMPOSITE AND PROCESS FOR PRODUCING POROUS SUPPORT-ZEOLITE MEMBRANE COMPOSITE

(71) Applicant: MITSUBISHI CHEMICAL CORPORATION, Chiyoda-ku (JP)

(72) Inventors: Nobutake Tanabe, Fukuoka (JP); Takahiko Takewaki, Kanagawa (JP); Miki Yamada, Kanagawa (JP); Kouhei Takatani, Kanagawa (JP)

(73) Assignee: MITSUBISHI CHEMICAL CORPORATION, Chiyoda-ku (JP)

( * ) Notice: Subject to any disclaimer, the term of this patent is extended or adjusted under 35 U.S.C. 154(b) by 9 days.

This patent is subject to a terminal disclaimer.

(21) Appl. No.: 16/524,420

(22) Filed: Jul. 29, 2019

(65) Prior Publication Data

US 2019/0344223 A1 Nov. 14, 2019

Related U.S. Application Data

(63) Continuation of application No. 15/296,705, filed on Oct. 18, 2016, now Pat. No. 10,406,486, which is a (Continued)

(30) Foreign Application Priority Data

Apr. 18, 2014 (JP) .................................. 2014-086677

(51) Int. Cl.
*B01D 69/12* (2006.01)
*B01D 71/02* (2006.01)
(Continued)

(52) U.S. Cl.
CPC ......... *B01D 71/028* (2013.01); *B01D 53/228* (2013.01); *B01D 53/268* (2013.01);
(Continued)

(58) Field of Classification Search
None
See application file for complete search history.

(56) References Cited

U.S. PATENT DOCUMENTS 4,447,552 A * 5/1984 Hayes ...................... B01J 21/20
208/120.1
4,544,538 A 10/1985 Zones
(Continued)

FOREIGN PATENT DOCUMENTS

CN 101035609 9/2007
CN 101072626 11/2007
(Continued)

OTHER PUBLICATIONS

Japanese Office Action dated Jul. 1, 2020 in Japanese Patent Application No. 2019-197613 (with English translation), 10 pages.
(Continued)

*Primary Examiner* — Chester T Barry
(74) *Attorney, Agent, or Firm* — Oblon, McClelland, Maier & Neustadt, L.L.P.

(57) ABSTRACT

The present invention relates to a process for producing a porous support-zeolite membrane composite, which comprises forming a CHA type zeolite membrane on a porous support by a hydrothermal synthesis in the presence of seed crystals, wherein an FAU type zeolite is used as the seed crystals.

5 Claims, 2 Drawing Sheets

Related U.S. Application Data continuation of application No. PCT/JP2015/061910, filed on Apr. 17, 2015.

(51) Int. Cl.

| | | |
|---|---|---|
| *B01D 53/22* | (2006.01) | |
| *B01D 67/00* | (2006.01) | |
| *B01D 53/26* | (2006.01) | |
| *B01D 69/04* | (2006.01) | |
| *B01D 61/36* | (2006.01) | |
| *B01D 69/10* | (2006.01) | |

(52) U.S. Cl.
CPC ....... *B01D 61/362* (2013.01); *B01D 67/0051* (2013.01); *B01D 69/04* (2013.01); *B01D 69/12* (2013.01); *B01D 69/10* (2013.01); *B01D 2253/1085* (2013.01); *B01D 2257/80* (2013.01); *B01D 2323/12* (2013.01)

(56) References Cited

U.S. PATENT DOCUMENTS

| | | | |
|---|---|---|---|
| 5,554,286 | A | 9/1996 | Okamoto et al. |
| 10,406,486 | B2 * | 9/2019 | Tanabe ............... B01D 67/0051 |
| 2011/0073270 | A1 * | 3/2011 | Stotzel ..................... B22C 3/00 164/47 |
| 2011/0160039 | A1 | 6/2011 | Hemeno |
| 2012/0024777 | A1 | 2/2012 | Sugita et al. |
| 2013/0055892 | A1 | 3/2013 | Spiegelman |
| 2014/0190146 | A1 | 7/2014 | Fujita et al. |
| 2014/0291245 | A1 * | 10/2014 | Inukai .................. B01D 71/028 210/651 |
| 2014/0331860 | A1 | 11/2014 | Isomura |
| 2015/0190755 | A1 | 7/2015 | Miyahara |
| 2015/0224451 | A1 | 8/2015 | Miyahara |
| 2015/0224487 | A1 | 8/2015 | Miyahara |
| 2016/0023187 | A1 | 1/2016 | Hedlund |
| 2016/0361691 | A1 | 12/2016 | Hagio |

FOREIGN PATENT DOCUMENTS

| | | |
|---|---|---|
| CN | 102333584 A | 1/2012 |
| CN | 103687932 A | 3/2014 |
| EP | 2 402 071 A1 | 1/2012 |
| EP | 2 783 742 A1 | 10/2014 |
| JP | 7-185275 | 7/1995 |
| JP | 2000-237561 | 9/2000 |
| JP | 2003-144871 | 5/2003 |
| JP | 2007-311390 | 12/2007 |
| JP | 2011-16123 | 1/2011 |
| JP | 2011-516264 | 5/2011 |
| JP | 2011-121040 | 6/2011 |
| JP | 2013-126649 | 6/2013 |
| WO | 9311087 | 6/1993 |
| WO | WO 2012/147618 A1 | 11/2012 |
| WO | WO 2013/125661 A1 | 8/2013 |

OTHER PUBLICATIONS

Combined Chinese Office Action and Search Report dated Sep. 20, 2018 in Patent Application No. 201580020377.6 (with English language translation and English language translation of categories of cited documents).

Japanese Office Action dated Mar. 26, 2019 in Japanese Patent Application No. 2016-513846 (with unedited computer generated English translation), 5 pages.

Office Action dated May 4, 2018 in European Patent Application No. 15 780 170.5, 6 pages.

Office Action as received in the corresponding European patent application No. 15780170.5-1104 dated Jun. 13, 2019.

Extended European Search Report dated Mar. 6, 2017 in Patent Application No. 15780170.5.

Rongfei Zhou, et al., "Preparation of Chabazite Membranes by Secondary Growth Using Zeolite-T-Directed Chabazite Seeds" Microporous and Mesoporous Materials, vol. 179, XP028689353, Jun. 15, 2013, pp. 128-135.

Xiansen Li, et al., "Influence of the Hydrothermal Synthetic Parameters on the Pervaporative Separation Performances of CHA-type Zeolite Membranes" Microporous and Mesoporous Materials, vol. 143, No. 2, XP028388036, Mar. 4, 2011, pp. 270-276.

Ayako Yashiki, et al., "Hydrothermal Conversion of FAU Zeolite into LEV Zeolite in the Presence of Non-Calcined Seed Crystals" Journal of Crystal Growth, vol. 325, No. 1, XP055071366, Jun. 1, 2011, pp. 96-100.

Masaya Itakura, et al., "Synthesis of High-Silica CHA Zeolite from FAU Zeolite in the Presence of Benzyltrimethylammonium Hydroxide" Chemistry Letters, vol. 37, No. 9, XP055250258, Jan. 1, 2008 pp. 908-909.

International Search Report dated Jul. 14, 2015 in PCT/JP2015/061910, filed on Apr. 17, 2015 (with English Translation).

Written Opinion dated Jul. 14, 2015 in PCT/JP2015/061910, filed on Apr. 17, 2015.

Japanese Office Action dated Jul. 1, 2020 in Japanese Patent Application No. 2019-19713 (with English translation), 10 pages.

Office Action dated Apr. 30, 2020 in corresponding European Patent Application No. 15 780 170.5, 5 pages.

Office Action received in the corresponding CN patent application No. 201910102615.8 dated Mar. 8, 2021 w/English Translation, 14 pages.

Office Action received in the corresponding JP patent application No. 2019-197613 dated Mar. 30, 2021 w/Machine English Translation, 10 pages.

Office Action as received in the corresponding European patent application No. 15780170.5, 6 pages.

\* cited by examiner

[Fig. 1]
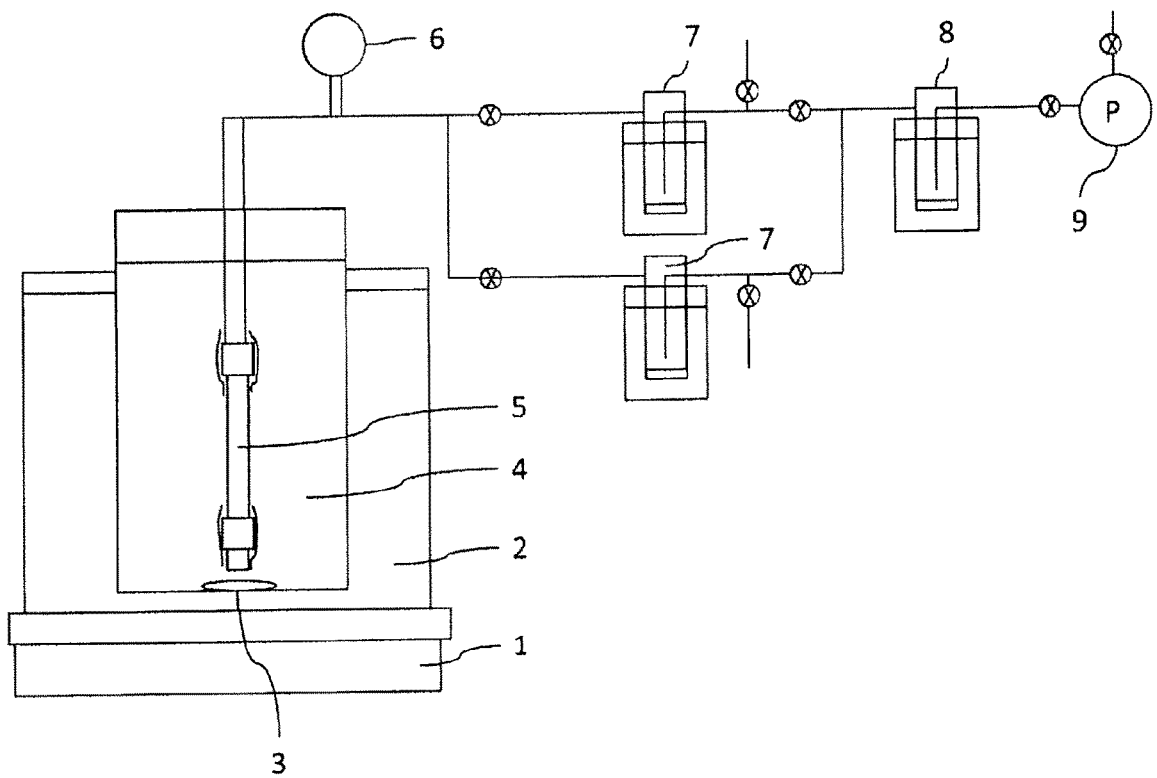
[Fig. 2]
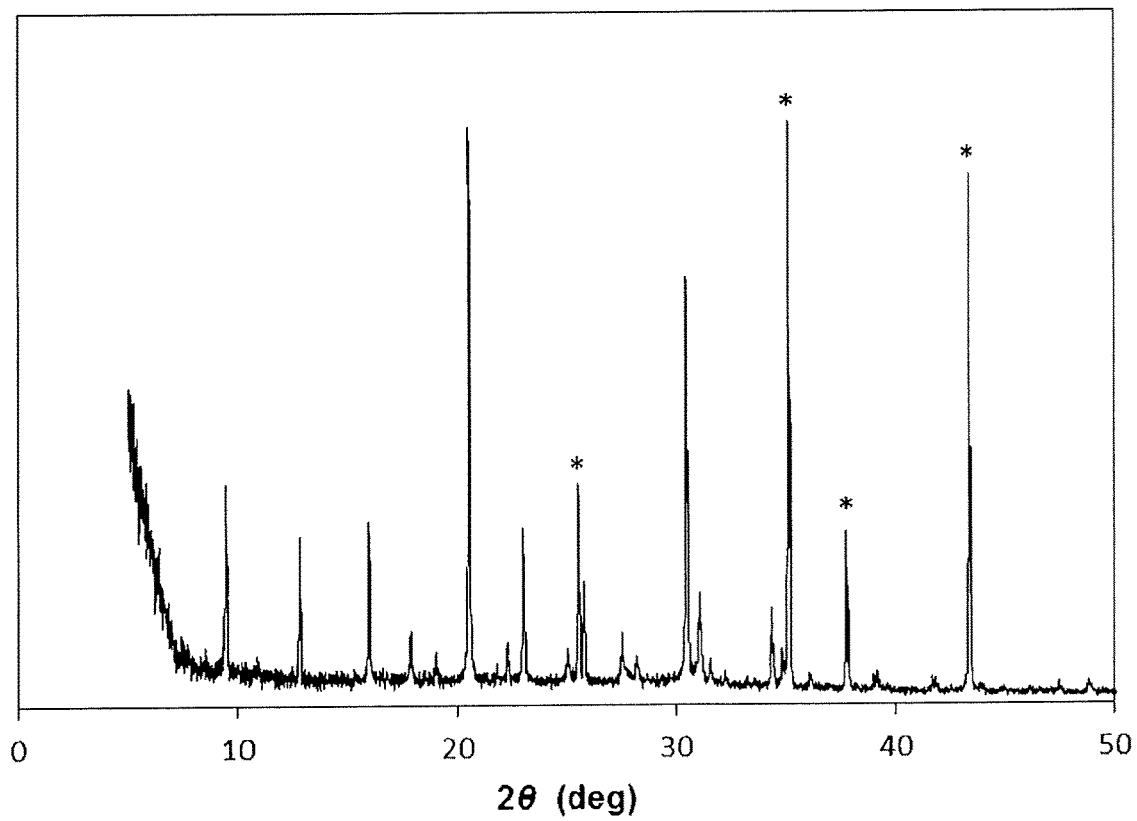
* PEAKS DERIVED FROM SUPPORT

[Fig. 3]

POROUS SUPPORT-ZEOLITE MEMBRANE COMPOSITE AND PROCESS FOR PRODUCING POROUS SUPPORT-ZEOLITE MEMBRANE COMPOSITE

CROSS-REFERENCE TO RELATED APPLICATIONS

This application is a continuation of U.S. application Ser. No. 15/296,705 filed Oct. 18, 2016, now U.S. Pat. No. 10,406,486, which is a national stage application of PCT/JP2015/061910 filed Apr. 17, 2015 and claims the benefit of JP 2014-086677 filed Apr. 18, 2014.

TECHNICAL FIELD

The present invention relates to a process for producing a porous support-zeolite membrane composite, and more specifically to a process in which a CHA type zeolite membrane is formed on a porous support by hydrothermal synthesis in the presence of specific seed crystals to produce a porous support-zeolite membrane composite.

The present invention further relates to a porous support-zeolite membrane composite which is excellent in terms of the separation of lower alcohols, substances that react with acid sites of zeolites, such as electrophilic molecules, etc.

BACKGROUND ART

Heretofore, separation or concentration of a gas or liquid mixture that contains an organic substance is carried out by distillation, azeotropic distillation, or solvent extraction/distillation or with an adsorbent, etc., in accordance with the properties of the substance to be separated or concentrated. However, these methods have a drawback in that the methods require much energy or the methods are applicable only to a limitative range of substances to be separated or concentrated.

Recently, as a separation method capable of being an alternative to these methods, a membrane separation/concentration method has been proposed in which a membrane such as a polymer membrane or a zeolite membrane is used. Polymer membranes such as, for example, flat membranes and hollow fiber membranes have excellent workability but have a drawback in that the heat resistance thereof is low. In addition, polymer membranes have poor chemical resistance, and many polymer membranes swell upon contact with organic substances such as, in particular, organic solvents and organic acids. Consequently, polymer membranes are applicable only to a limitative range of substances to be separated or concentrated.

Meanwhile, zeolite membranes are usually used for separation or concentration as porous support-zeolite membrane composites which each include a porous support and a filmy zeolite formed thereon. For example, a mixture of an organic substance and water is brought into contact with a porous support-zeolite membrane composite to make the water selectively pass therethrough. Thus, the organic substance can be separated or concentrated.

Compared to separation by distillation or with an adsorbent, the separation or concentration using a membrane of an inorganic material such as a zeolite not only can reduce the amount of energy to be used but also can be carried out in a broader temperature range than with polymer membranes. Moreover, such inorganic membranes are applicable to separation of a mixture that contains an organic compound Hitherto, A-type zeolite membranes (PTL 1) have industrially been used as zeolite membranes. A-type zeolite membranes have high hydrophilicity and high dehydrating ability. However, A-type zeolite membranes have an $SiO_2/Al_2O_3$ molar ratio (hereinafter often called SAR) as low as 2 and hence have problems concerning water resistance and acid resistance. These zeolite membranes have been usable in limited systems. There have also been proposed: a method in which a mordenite type porous support-zeolite membrane composite is used for an alcohol/water mixture system to make the water selectively pass therethrough and thereby concentrate the alcohol (PTL 2); a method in which a ferrierite type porous support-zeolite membrane composite is used for an acetic acid/water mixture system to make the water selectively pass therethrough and thereby separate and concentrate the acetic acid (PTL 3); etc. However, the mordenite type porous support-zeolite membrane composite disclosed in PTL 2 and the ferrierite type porous support-zeolite membrane composite disclosed in PTL 3 have low permeation flux, and the throughputs therewith are insufficient for practical use.

A CHA type zeolite membrane has been proposed as a zeolite membrane composite having an improved permeation flux (Non-PTL 1).

Furthermore, a CHA type zeolite membrane that has a high SAR and is dense has been proposed as a membrane which is excellent in terms of acid resistance and water resistance, has a permeation flux sufficient for practical use, and has high separation performance (PTL 4).

PRIOR-ART LITERATURE

Patent Literature

PTL 1: JP-A-7-185275
PTL 2: JP-A-2003-144871
PTL 3: JP-A-2000-237561
PTL 4: JP-A-2011-121040

Non-Patent Literature

Non-PTL 1: Microporous and Mesoporous Materials, 143 (2011) 270-276

SUMMARY OF THE INVENTION

Problems that the Invention is to Solve

However, in the method disclosed in Non-PTL 1, CHA type seed crystals are used to synthesize a synthetic sol having an SAR of about 5, without using an organic template. The time period required for synthesizing this CHA type zeolite membrane is as long as one day or more, and the permeation flux and separation factor thereof are considered to be still insufficient although having been improved as compared with those of conventional membranes. Meanwhile, in the production process described in PTL 4, since an organic template is used for synthesizing the membrane, it is necessary during the production of the zeolite membrane to conduct burning in order to remove the organic template and there has been a problem in that a prolonged production period and an increased cost result. In addition, there has been a problem in that the zeolite membrane has a large number of acid sites attributable to the organic template and this zeolite membrane is difficult to use for separating substances which react with acid sites.

A subject for the invention is to provide a porous support-zeolite membrane composite which is excellent in terms of acid resistance and water resistance, has a sufficient permeation flux, and is suitable not only for the separation of lower alcohols but also for separating substances which react with acid sites of zeolites, such as electrophilic molecules. Another subject for the invention is to provide a process for industrially and easily producing such porous support-zeolite membrane composite in a short time period.

Means for Solving the Problems

The present inventors diligently made investigations in order to overcome the problems and, as a result, have discovered that those problems can be eliminated with a zeolite membrane having specific properties. The inventors have further discovered that by using an FAU type zeolite as seed crystals when performing hydrothermal synthesis for forming a CHA type zeolite membrane, a CHA type zeolite membrane having a properly controlled SAR and having a high permeation flux and a high separation factor can be produced in a short time period without necessitating the use of an organic template. The present invention has been thus achieved.

Specifically, the gist of the invention resides in the following.

[1] A process for producing a porous support-zeolite membrane composite, which comprises forming a CHA type zeolite membrane on a porous support by a hydrothermal synthesis in the presence of seed crystals,
wherein an FAU type zeolite is used as the seed crystals.
[2] The process for producing a porous support-zeolite membrane composite according to the [1] above, wherein the seed crystals are adhered beforehand to the porous support and the CHA type zeolite membrane is formed.
[3] The process for producing a porous support-zeolite membrane composite according to the [1] or [2] above, wherein
the hydrothermal synthesis is conducted in an aqueous reaction mixture comprising an Si element source and water, and
the Si element source is an amorphous substance or an alkoxysilane.
[4] The process for producing a porous support-zeolite membrane composite according to any one of the [1] to [3] above, wherein the seed crystals have an $SiO_2/Al_2O_3$ molar ratio of less than 15.
[5] The process for producing a porous support-zeolite membrane composite according to any one of the [1] to [4] above, wherein the CHA type zeolite membrane formed has an $SiO_2/Al_2O_3$ molar ratio of 15 or less.
[6] A porous support-zeolite membrane composite produced by the process for production according to any one of the [1] to [5] above.
[7] A porous support-zeolite membrane composite where when an $SiO_2/Al_2O_3$ molar ratio of a portion of the zeolite membrane in the vicinity of the interface between the porous support and the zeolite membrane is X and an $SiO_2/Al_2O_3$ molar ratio of an inner portion of the zeolite membrane is Y, X/Y satisfies the following expression (1):

$$0.70<X/Y<1.2 \qquad (1)$$

[8] A porous support-zeolite membrane composite comprising a porous support and a zeolite membrane formed on the porous support,
wherein a portion of the zeolite membrane which is located in the vicinity of the interface between the porous support and the zeolite membrane has substantially the same crystallinity as an inner portion of the zeolite membrane.
[9] A porous support-zeolite membrane composite comprising a porous support and a zeolite membrane formed on the porous support,
wherein in a water vapor diffusion measurement, the time period Q (minutes) required for the detection intensity of desorbed water to decrease from a maximum value to 1/20 thereof satisfies the following expression (2):

$$7.0<Q<30 \qquad (2)$$

[10] The porous support-zeolite membrane composite according to any one of the [7] to [9] above, wherein the zeolite membrane is a CHA type zeolite membrane.
[11] The porous support-zeolite membrane composite according to any one of the [7] to [10] above, wherein the zeolite membrane has an $SiO_2/Al_2O_3$ molar ratio, as determined through a measurement made from the membrane surface side, of 15 or less.
[12] A method for separating a gas or liquid mixture, which comprises bringing the gas or liquid mixture into contact with the porous support-zeolite membrane composite according to any one of the [6] to [11] above to make a highly permeative substance pass through the composite and to thereby separate the highly permeative substance from the mixture.
[13] The separation method according to the [12] above, wherein the gas or liquid mixture is a mixture which contains a compound including a double bond.

Effects of the Invention

According to the invention, a porous support-zeolite membrane composite which is excellent in terms of acid resistance and water resistance and has a sufficient permeation flux can be produced in a short time period. Furthermore, since this porous support-zeolite membrane composite can be produced without using an organic template, the porous support-zeolite membrane composite obtained has few acid sites attributable to organic template and is suitable also for the separation of substances which are prone to react with acid sites.

BRIEF DESCRIPTION OF THE DRAWINGS

FIG. 1 is a diagrammatic view of an apparatus for use in a pervaporation method.
FIG. 2 is an X-ray diffraction (XRD) pattern of the zeolite membrane obtained in Example 1.

MODES FOR CARRYING OUT THE INVENTION

Figure 3A:
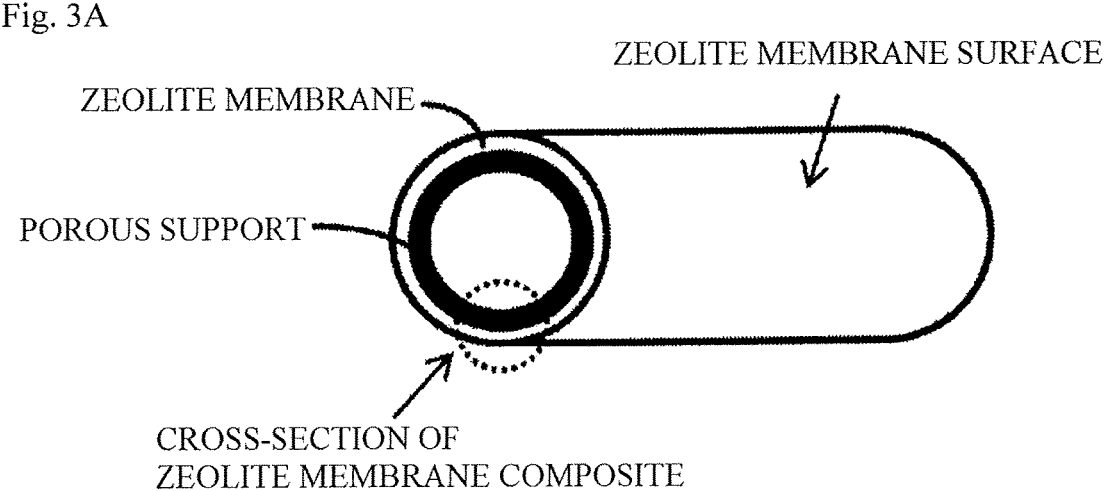
FIG. 3A is a schematic view of one example of the zeolite membrane composite.

The following explanations on constituent features are for examples (representative examples) of embodiments of the invention, and the invention is not limited to the contents thereof. In this description, "weight" has the same meaning as "mass", and "% by weight" has the same meaning as "% by mass".

The process of the invention for producing a porous support-zeolite membrane composite is a process for producing a porous support-zeolite membrane composite by forming a CHA type zeolite membrane on a porous support by hydrothermal synthesis in the presence of seed crystals, and is characterized by using an FAU type zeolite as the seed crystals.

First, these constituent features of the invention are further explained in detail. In this description, "porous support-zeolite membrane composite" is often referred to simply as "zeolite membrane composite", and "porous support" is often referred to simply as "support".

(CHA Type Zeolite)

The term "CHA type zeolite" used in the invention means any of zeolites of the CHA structure in terms of the code for specifying zeolite structure as provided for by International Zeolite Association (IZA). CHA type zeolite is equal in crystal structure to naturally occurring chabazite. CHA type zeolite has a structure characterized by having three-dimensional pores formed by 8-membered oxygen rings having sizes of 3.8×3.8 Å, and this structure is characterized by X-ray diffraction data.

The CHA type zeolite used in the invention has a framework density of 14.5 T/1,000 Å. The term "framework density" means the number of atoms of non-oxygen elements which constitute the framework, per 1,000 Å$^3$ of the zeolite, and the value thereof is determined by the structure of the zeolite.

Relationships between framework density and zeolite structure are shown in *ATLAS OF ZEOLITE FRAMEWORK TYPES Fifth Revised Edition*, 2001, ELSEVIER.

(FAU Type Zeolite)

The term "FAU type zeolite" used in the invention means any of zeolites of the FAU structure in terms of the code for specifying zeolite structure as provided for by International Zeolite Association (IZA). FAU type zeolite is equal in crystal structure to naturally occurring faujasite. FAU type zeolite has a structure characterized by having three-dimensional pores formed by 12-membered oxygen rings having sizes of 7.4×7.4 Å, and this structure is characterized by X-ray diffraction data.

The FAU type zeolite used in the invention has a framework density of 12.7 T/1,000 Å.

In general, FAU type zeolites include one of the X type and one of the Y type.

(Porous Support)

The porous support to be used in the invention may be any porous support which is constituted of an inorganic porous material (inorganic porous support) and which has such chemical stability that the zeolite can be crystallized in a film form on a surface and other parts thereof. Examples thereof include sintered ceramics, sintered metals such as iron, bronze, and stainless steel, glasses, and molded carbon objects.

Preferred of these porous supports are inorganic porous supports (ceramic supports) which include an object obtained by sintering a ceramic that is a solid material in which the basic components or a great part is constituted of inorganic non-metallic substances. In cases when any of these ceramic supports is used, some of the ceramic support becomes a zeolite during the zeolite membrane synthesis and this is effective in enhancing the interfacial adhesion.

Specific examples of the ceramic supports include supports constituted of sintered ceramics including silica, alumina such as α-alumina and γ-alumina, mullite, zirconia, titania, yttria, silicon nitride, and silicon carbide. Preferred of these are supports each including at least one of alumina, silica, and mullite. In cases when these supports are used, partial conversion into zeolite is easy and, hence, tenacious bonding between the support and the zeolite is attained, making it easy to form a dense membrane having high separation performance.

The shape of the porous support is not particularly limited so long as a gas mixture or a liquid mixture can be effectively separated with the porous support. Examples thereof include a flat plate shape, a tubular shape such as a cylindrical tubular shape, a honeycomb shape which has many cylindrical or prismatic holes therein, and a monolithic shape.

In the invention, a zeolite is crystallized in a membrane form on such a porous support, that is, on a surface, etc. of the support. The surface of the support may be any of the surfaces of the support in accordance with the shape thereof, and may be each of a plurality of surfaces. For example, in the case of a cylindrical tubular support, the zeolite may be crystallized on either the outer surface or the inner surface, or may be crystallized on both the outer and the inner surfaces if desired.

The mean pore size of the pores possessed by the surface of the porous support is not particularly limited. However, the porous support preferably is one which has a regulated pore size. The mean pore size thereof is usually 0.02 μm or larger, preferably 0.05 μm or larger, more preferably 0.1 μm or larger, and is usually 20 μm or less, preferably m or less, more preferably 5 μm or less. Too small mean pore sizes tend to result in a reduced permeation rate. Too large mean pore sizes may result in cases where the support itself has insufficient strength or where the proportion of pores in the support surface increases, making it difficult to form a dense zeolite membrane.

The mean thickness (wall thickness) of the support is usually 0.1 mm or larger, preferably 0.3 mm or larger, more preferably 0.5 mm or larger, and is usually 7 mm or less, preferably 5 mm or less, more preferably 3 mm or less. The support is used for the purpose of imparting mechanical strength to the zeolite membrane. However, in case where the mean thickness of the support is too small, the porous support-zeolite membrane composite does not have sufficient strength and tends to have poor resistance to impacts, vibrations, etc., posing problems concerning practical use. In case where the mean thickness of the support is too large, there is a tendency that the substance which has permeated shows poor diffusion, resulting in a reduced permeation flux.

The porosity of the porous support is usually 20% or higher, preferably 25% or higher, more preferably 30% or higher, and is usually 70% or less, preferably 60% or less, more preferably 50% or less. The porosity of the support governs the permeation flow rate in gas or liquid separation. In case where the porosity thereof is less than the lower limit, the substance which has permeated tends to be inhibited from diffusing. In case where the porosity thereof exceeds the upper limit, this support tends to have reduced strength.

It is preferable that the surface of the porous support should be smooth, and the surface may be polished with a file or the like. The term "surface of the porous support" means a surface portion of the inorganic porous support on which a zeolite is crystallized, and that surface may be any surface of the porous support having any of the shapes shown above or may be each of multiple surfaces thereof. For example, in the case of a cylindrical tubular support, that surface may be either the outer surface or the inner surface, or may be each of the outer and inner surfaces thereof if desired.

(Porous Support-Zeolite Membrane Composite)

The porous support-zeolite membrane composite of the invention (zeolite membrane composite 1) in which, when an $SiO_2/Al_2O_3$ molar ratio of a portion of the zeolite membrane in the vicinity of the interface between the porous support and the zeolite membrane is X and an $SiO_2/Al_2O_3$ molar ratio of an inner portion of the zeolite membrane is Y, X/Y satisfies the following expression (1), is explained below.

[Math. 1]

$$0.70 < X/Y < 1.2 \quad (1)$$

As described above, the invention provides a zeolite separation membrane which is especially suitable not only for the separation of lower alcohols but also for separating substances that react with acid sites of zeolites, such as electrophilic molecules. That the zeolite membrane satisfies the range defined by expression (1) means that the portion of the zeolite membrane which is located in the vicinity of the interface between the support and the zeolite membrane has substantially the same crystallinity as the inner portion of the zeolite membrane. This is thought to be one of the causes of the effects of the invention as described above.

Figure 3B:
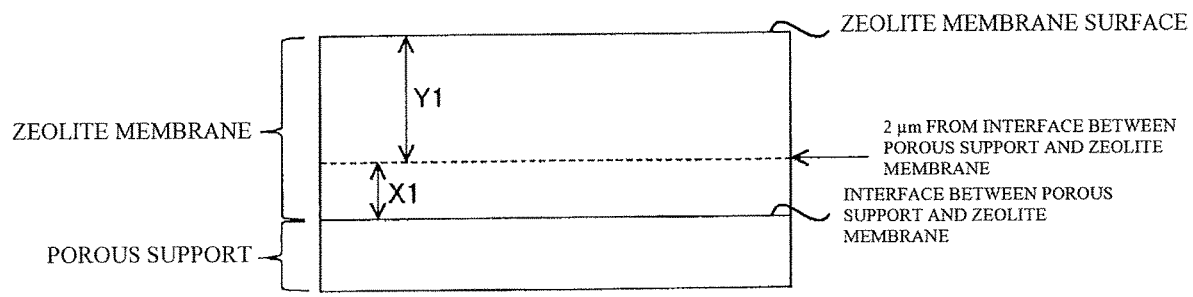
FIG. 3B is an enlarged view of a cross-section of the zeolite membrane composite.

In FIG. 3A and FIG. 3B are shown schematic views of an example of the zeolite membrane composite. As shown in FIG. 3B, the term "portion of the zeolite membrane in the vicinity of the interface between the support and the zeolite membrane" means region X1 which lies from the interface between the zeolite membrane and the porous support to a distance of 2 μm therefrom toward the surface of the zeolite membrane. Meanwhile, the term "inner portion of the zeolite membrane" means region Y1 which lies from the plane located at a distance of 2 μm from the interface between the zeolite membrane and the porous support toward the zeolite membrane surface to the surface of the zeolite membrane.

The $SiO_2/Al_2O_3$ molar ratio in expression (1) is a value calculated through an EDS line profile examination of a cross-section of the zeolite membrane composite. Specifically, the molar ratio is determined by the following method.

First, the zeolite membrane composite is cut into an appropriate size, and a cross-section thereof is smoothened by irradiation with Ar ion beams using a cross-section polisher. The cross-section thus produced is subjected to an SEM-EDX measurement to acquire a spectrum for each of points located at intervals of 0.1 μm on a perpendicular straight line extending from the zeolite membrane surface side toward the support side. The spectral intensities are subjected to a ZAF correction to calculate semi-quantitative values of Si and Al. The semi-quantitative values obtained are plotted against the distance as abscissa, thereby obtaining an EDS line profile. $SiO_2/Al_2O_3$ molar ratios are obtained from this EDS line profile.

With respect to conditions for the SEM-EDX measurement, the accelerating voltage is preferably 6-10 kV (especially preferably 6 kV) and the magnification is preferably 1,000-5,000 diameters.

From the $SiO_2/Al_2O_3$ molar ratios thus obtained, the $SiO_2/Al_2O_3$ molar ratio X of the portion of the zeolite membrane in the vicinity of the interface between the support and the zeolite membrane and the $SiO_2/Al_2O_3$ molar ratio Y of the inner portion of the zeolite membrane are calculated. X is a mean value of the $SiO_2/Al_2O_3$ molar ratios for the region (X1) which lies from the interface between the zeolite membrane and the support to a distance of 2 μm therefrom toward the surface of the zeolite membrane, and Y is a mean value of the $SiO_2/Al_2O_3$ molar ratios for the region (Y1) which lies from the plane located at a distance of 2 μm from the interface between the zeolite membrane and the support toward the zeolite membrane surface to the surface of the zeolite membrane.

X/Y may be any value which is larger than 0.70 but less than 1.2. However, X/Y is preferably 0.75 or larger, more preferably 0.80 or larger, even more preferably 0.85 or larger, and is preferably 1.1 or less, more preferably 1.0 or less, even more preferably 0.95 or less. In cases when X/Y is within this range, the effects of the invention can be obtained.

For obtaining the porous support-zeolite membrane composite of the invention which satisfies expression (1), it is important that the seed crystals should be rapidly converted to a zeolite membrane and the zeolite membrane be grown.

For rapidly converting the seed crystals into a zeolite membrane, it is effective to use highly reactive seed crystals. Specific examples thereof include: a method in which use is made of seed crystals of, for example, an FAU type zeolite that have some the structure of the desired zeolite; a method in which seed crystals having a small particle size are used; and a method in which use is made of seed crystals that have been made to have enhanced surface reactivity by a surface treatment such as an alkali treatment. Especially effective of these is the method in which use is made of an FAU type zeolite, which has some of the structure of the desired zeolite. This method will be described later.

Furthermore, an explanation is given on the porous support-zeolite membrane composite of the invention (zeolite membrane composite 2) which includes a porous support and a zeolite membrane formed thereon and in which in a water vapor diffusion measurement, the time period Q (minutes) required for the detection intensity of desorbed water to decrease from a maximum value to 1/20 thereof satisfies the following expression (2).

[Math. 2]

$$7.0 < Q < 30 \quad (2)$$

Since the zeolite membrane composite satisfies expression (2), this zeolite membrane is excellent in terms of hydrophilicity, evenness, and diffusing property and also in terms of acid resistance and water resistance. It is thought that due to this zeolite membrane, the zeolite membrane composite is suitable also for separating lower alcohols or substances which are prone to react with acid sites.

The water vapor diffusion measurement is made in the following manner. First, the zeolite membrane composite is cut into an appropriate size to obtain a specimen. This specimen is placed in a measuring cell made of stainless steel. Pipelines (upstream-side and downstream-side pipelines) serving as gas channels have been connected to the measuring cell. A downstream-side portion of the measuring cell has been connected to a differential evacuation pump. There is a mass spectrometer somewhere in the channel between the measuring cell and the differential evacuation pump so that some of the gas discharged from the measuring cell is introduced into the mass spectrometer without flowing into the differential evacuation pump.

Helium gas is introduced from the upstream side to make the inside of the specimen-containing measuring cell a helium atmosphere. Thereafter, differential evacuation is conducted while continuing helium gas introduction, thereby depressurizing the inside of the measuring cell to about 80 kPa and removing adsorbed water, etc. from the specimen at 140° C. After having been held for 1 hour, the specimen is kept in contact with the vapor of an ethanol/water mixture liquid (water concentration, 0.2% by weight)

for 1 hour. After the 1-hour contact, the inside of the measuring cell is made to be a helium atmosphere and then depressurized. Specifically, differential evacuation is conducted while continuing helium gas introduction, thereby depressurizing the inside of the measuring cell to about 80 kPa. During this depressurization, the behavior of the water being introduced into the mass spectrometer is examined to thereby obtain detection intensities of the desorbed water. The point of time when the detection intensity of the desorbed water has a maximum value is taken as 0 minute, and the time period required for the detection intensity of the desorbed water to drop to $\frac{1}{20}$ the maximum value is expressed by Q (minutes).

Q may be any value which is larger than 7.0 but less than 30. However, Q is preferably 10 or larger, more preferably 12 or larger, and is preferably 20 or less, more preferably 17 or less.

Examples of methods for obtaining the porous support-zeolite membrane composite of the invention which satisfies the expression (2) include: a method in which the hydrophilicity of the zeolite membrane is controlled by controlling the $SiO_2/Al_2O_3$ molar ratio thereof or by controlling the amount of defects therein; a method in which membrane evenness is controlled by attaining an appropriate crystal size or carrying out the synthesis in a short time period, by controlling the synthesis conditions; and a method in which the dispersing properties are improved by selecting a zeolite having a three-dimensional pore structure or by selecting a zeolite having a low framework density. Examples of the method in which membrane evenness is controlled include a method in which the FAU type zeolite which will be described later is used as seed crystals. Although one of these techniques may be used, it is preferred to use two or more thereof in combination.

Zeolite membrane composite 1 and zeolite membrane composite 2 are each not particularly limited in the crystal structure of the zeolite membrane. However, the crystalline-zeolite framework which constitutes the pores of the zeolite membrane is preferably an 8-membered or smaller oxygen ring, more preferably a 6- to 8-membered oxygen ring.

Examples of the structure of the zeolite include AEI, AFG, ANA, CHA, DDR, EAB, ERI, ESV, FAR, FRA, GIS, ITE, KFI, LEV, LIO, LOS, LTA, LTN, MAR, PAU, RHO, RTH, SOD, STI, TOL, and UFI. It is preferred to use a membrane constituted of a zeolite of the AEI, CHA, DDR, ERI, KFI, LEV, PAU, RHO, RTH, SOD, LTA, or UFI type among those. It is more preferable that the membrane should be constituted of a CHA, DDR, RHO, or SOD type zeolite. Preferred of these is a CHA type zeolite. It is preferable that the zeolite should be an aluminosilicate.

Incidentally, in a zeolite having n-membered oxygen rings, the value of n indicates the number of oxygen atoms for the pores which are the largest in the number of atoms of oxygen element among the pores that each are constituted of a zeolite framework and elements T (non-oxygen elements constituting the framework).

With respect to components which constitute the zeolite membrane, the zeolite membrane may contain inorganic binders, such as silica and alumina, a silylating agent for modifying the zeolite surface, etc., besides the zeolite, according to need. Furthermore, the zeolite membrane in the invention may partly contain an amorphous component or the like, but it is preferable that the zeolite membrane is substantially constituted of one or more zeolites alone.

The thickness of the zeolite membrane is not particularly limited. However, the thickness thereof is usually 0.1 µm or larger, preferably 0.6 µm or larger, more preferably 1.0 µm or larger, even more preferably 5.0 µm or larger, and is usually 100 µm or less, preferably 60 µm or less, more preferably 20 µm or less.

The grain size of the zeolite is not particularly limited. However, too small grain sizes thereof tend to result in a decrease in, for example, permeation selectivity due to an increase in the amount of grain boundaries, etc. Consequently, the grain size of the zeolite is usually 30 nm or larger, preferably 50 nm or larger, more preferably 100 nm or larger, and an upper limit thereof is the thickness of the membrane. Especially preferred is the case where the grain size of the zeolite is the same as the thickness of the membrane. In cases when the grain size of the zeolite is the same as the thickness of the membrane, the amount of grain boundaries of the zeolite is minimum.

(Process for Producing the Porous Support-Zeolite Membrane Composite)

In the production process of the invention, a CHA type zeolite membrane is formed on a porous support by hydrothermal synthesis using an FAU type zeolite as seed crystals.

The hydrothermal synthesis may be carried out, for example, by introducing a reaction mixture for hydrothermal synthesis which has a regulated makeup and has been homogenized (hereinafter, this reaction mixture is often referred to as "aqueous reaction mixture") into a heat-resistant pressure vessel, such as an autoclave, loosely fixing a porous support within the heat-resistant pressure vessel, closing the pressure vessel, and heating the contents for a certain time period.

It is preferable that the aqueous reaction mixture should include an Si element source and water. It is preferable that the aqueous reaction mixture should include an Si element source, an Al element source, and water and further contain an alkali source according to need.

As the Si element source for use in the aqueous reaction mixture, use can be made, for example, of amorphous substances such as amorphous silica, colloidal silica, silica gel, sodium silicate, and amorphous aluminosilicate gel and alkoxysilanes such as tetraethoxysilane (TEOS) and trimethylethoxysilane.

As the Al element source, use can be made, for example, of sodium aluminate, aluminum hydroxide, aluminum sulfate, aluminum nitrate, aluminum oxide, amorphous aluminosilicate gel, and the like. Besides the Al element source, sources of other elements may be contained. For example, sources of elements such as Ga, Fe, B, Ti, Zr, Sn, and Zn may be contained.

In the invention, since a suitable CHA type zeolite membrane can be obtained even when the aqueous reaction mixture during the hydrothermal synthesis contains no organic substance such as organic template, the aqueous reaction mixture need not contain an organic substance such as an organic template. From the standpoint of the acid sites, it is desirable that the aqueous reaction mixture should contain no organic substance.

Although it is desirable not to use an organic template in zeolite membrane synthesis because use thereof necessitates a burning step, an organic template can be used according to need.

The term "organic template" herein means a substance which is a structure-directing agent that directs the crystal structure of the zeolite being yielded, that is, serves as a template agent, and which, in particular, is an organic compound.

In the case of using an organic template, the ratio between the Si element source and the organic template in the aqueous reaction mixture, in terms of the molar ratio of the organic template to SiO$_2$ (organic template/SiO$_2$ molar ratio), is usually 0.005 or higher, preferably 0.01 or higher, and is usually 1 or less, preferably 0.4 or less, more preferably 0.2 or less, even more preferably 0.1 or less. In cases when the organic template/SiO$_2$ molar ratio is within that range, a denser zeolite membrane can be yielded.

As the organic template, use is usually made of an amine or a quaternary ammonium salt. Preferred examples thereof include the organic templates shown in U.S. Pat. No. 4,544,538 and U.S. Patent Application Publication No. 2008/0075656.

Specific examples thereof include cations derived from alicyclic amines, such as cations derived from 1-adamantanamine, cations derived from 3-quinacridinal, and cations derived from 3-exo-aminonorbornene. More preferred of these are cations derived from 1-adamantanamine.

In cases when a cation derived from 1-adamantanamine is used as an organic template, a CHA type zeolite capable of forming a dense membrane crystallizes out.

More preferred of the cations derived from 1-adamantanamine are the cations of N,N,N-trialkyl-1-adamantanammoniums. The three alkyl groups of the cation of each N,N,N-trialkyl-1-adamantanammonium usually are independent alkyl groups, and each preferably are a lower alkyl group, more preferably methyl. The most preferred compound among these is the cation of N,N,N-trimethyl-1-adamantanammonium.

Such a cation is accompanied with an anion which exerts no adverse influence on the formation of a CHA type zeolite. Representative examples of the anion include halogen ions such as Cl$^-$, Br$^-$, and I$^-$, hydroxyl ion, acetic acid salts, sulfuric acid salts, and carboxylic acid salts. Especially suitable among these is hydroxyl ion.

Other usable organic templates are the cations of N,N,N-trialkylbenzylammoniums. In this case also, the alkyl groups are independent alkyl groups, and each preferably are a lower alkyl group, more preferably methyl. The most preferred compound among these is the cation of N,N,N-trimethylbenzylammonium. Examples of the anion which accompanies this cation are the same as shown above.

As the alkali source for use in the aqueous reaction mixture, use can be made of alkali metal hydroxides such as NaOH and KOH and hydroxides of alkaline earth metals, such as Ca(OH)$_2$.

The kind of alkali is not particularly limited, and use is usually made of Na, K, Li, Rb, Cs, Ca, Mg, Sr, Ba, or the like. Preferred of these are Na and K. It is most preferable that K should be contained. In the production process of the invention, use of, for example, K as the alkali is suitable for using FAU type seed crystals to form a zeolite membrane of not the FAU type but the CHA type.

The ratio between the Si element source and the Al element source in the aqueous reaction mixture is usually expressed in terms of molar ratio between the oxides of the respective elements, i.e., SiO$_2$/Al$_2$O$_3$ molar ratio.

The SiO$_2$/Al$_2$O$_3$ molar ratio is not particularly limited. However, the SiO$_2$/Al$_2$O$_3$ molar ratio is usually 5 or higher, preferably 6 or higher, more preferably 7 or higher, even more preferably 7.5 or higher, and is usually 10,000 or less, preferably 1,000 or less, more preferably 100 or less, even more preferably 12 or less.

In cases when the SiO$_2$/Al$_2$O$_3$ molar ratio is within that range, a zeolite membrane is densely yielded and the yielded zeolite shows high hydrophilicity and is selectively permeable to hydrophilic compounds, in particular water, contained in organic-substance-containing mixtures. In addition, a zeolite membrane which has high acid resistance and is less apt to suffer dealumination is obtained.

The ratio between the Si element source and the alkali source, in terms of M$_{(2/n)}$O/SiO$_2$ (where M represents an alkali metal or an alkaline earth metal, and n represents the valence thereof which is 1 or 2) molar ratio, is usually 0.05 or higher, preferably 0.1 or higher, more preferably 0.2 or higher, and is usually 1.0 or less, preferably 0.7 or less, more preferably 0.5 or less.

The ratio between the Si element source and the water, in terms of the molar ratio of the water to SiO$_2$ (H$_2$O/SiO$_2$ molar ratio), is usually 10 or higher, preferably 30 or higher, more preferably 40 or higher, especially preferably 50 or higher, and is usually 1,000 or less, preferably 500 or less, more preferably 200 or less, especially preferably 100 or less.

In cases when the molar ratios between substances in the aqueous reaction mixture are within those ranges, a denser zeolite membrane can be yielded. The amount of water is especially important for the formation of a dense zeolite membrane. Conditions wherein the proportion of water to silica is higher than in general conditions for a powder synthesis method tend to yield fine crystals to produce a dense membrane.

In general, the amount of water in synthesizing a powdery CHA type zeolite is about 15-50 in terms of H$_2$O/SiO$_2$ molar ratio. Use of conditions wherein H$_2$O/SiO$_2$ molar ratio is high (50-1,000), that is, the water amount is large, makes it possible to obtain a porous support-zeolite membrane composite having high separation performance and including a CHA type zeolite crystallized in a dense membrane form on the support.

(Seed Crystals)

In the invention, an FAU type zeolite is used as seed crystals and hydrothermal synthesis is conducted in the presence of the seed crystals, thereby forming a CHA type zeolite membrane.

The FAU type zeolite to be used as seed crystals may be any zeolite having an FAU type structure.

Examples of the FAU type zeolite include silicates and phosphates. Examples of the silicates include aluminosilicates, gallosilicates, ferrisilicates, titanosilicates, and borosilicates. Examples of the phosphates include aluminophosphates (ones called ALPO, e.g., ALPO-5) including aluminum and phosphorus, silicoaluminophosphates (ones called SAPO, e.g., SAPO-34) including silicon, aluminum, and phosphorus, and metalloaluminophosphates (ones called MeAPO, e.g., FAPO-5) containing an element such as Fe. Preferred of these are aluminosilicates and silicoaluminophosphates. More preferred are aluminosilicates.

FAU type zeolites generally include X type zeolites and Y type zeolites. Although either type or a mixture of both types may be used, it is desirable to use a Y type zeolite.

The FAU type zeolite to be used as seed crystals may be a commercial X type zeolite or Y type zeolite, or may be synthesized. General synthesis methods are described in VERIFIED SYNTHESES OF ZEOLITIC MATERIALS Second Revised Edition, 2001, ELSEVIER, p. 157, etc.

The FAU type zeolite to be used may be in the proton form or may be in an ion-exchanged form in which the protons have been replaced by ions of an alkali metal, ions of an alkaline earth metal, or ions of a transition metal, or may be a mixture of these. Examples of the alkali metal ions include Na$^+$, K$^+$, and Li$^+$, and examples of alkaline earth metal ions include Ca$^{2+}$, Mg$^{2+}$, Sr$^{2+}$, and Ba$^{2+}$. Examples of the transition metal ions include Fe, Cu, and Zn. Preferred of these are alkali metal ions such as Na$^+$, K$^+$, and Li$^+$.

The ion exchange may be conducted, for example, by a method in which the FAU type zeolite is treated with an aqueous solution that contains an ammonium salt such as $NH_4NO_3$ or $NaNO_3$, a hydroxide salt such as NaOH, an acetic acid salt such as $CH_3COONa$, or other ions with which the zeolite is ion-exchanged, and optionally further with an acid such as hydrochloric acid and is then rinsed with water.

The concentration of the aqueous solution is usually 0.00001 mol/L or higher, preferably 0.0001 mol/L or higher, more preferably 0.001 mol/L or higher, and is usually 10 mol/L or less, preferably 5 mol/L or less, more preferably 2 mol/L or less.

The temperature during the treatment is usually 10° C. or higher, preferably 30° C. or higher, more preferably 50° C. or higher, and is usually 200° C. or lower, preferably 150° C. or lower, more preferably 130° C. or lower.

The treatment period is usually 2 hours or longer, preferably 5 hours or longer, more preferably 10 hours or longer, even more preferably 20 hours or longer, and is usually 10 days or less, preferably 7 days or less, more preferably 4 days or less. Furthermore, this FAU type zeolite may be burned at 200-500° C. according to need.

It is desirable that the FAU type zeolite should finally be in the proton form, Na form, K form, or a mixture of these. More preferably, the treated FAU type zeolite is in the Na form or the proton form or is a mixture of these.

The $SiO_2/Al_2O_3$ ratio of the seed crystals, which is determined by ICP emission spectroscopy, is usually less than 15, preferably less than 12, more preferably less than 10, and is usually 1 or higher, preferably 3 or higher.

The particle sizes of the seed crystals are not particularly specified. It is, however, desirable that a particle size distribution analysis thereof should give at least one particle-size maximal value which is within a specific size range.

The term "maximal value" means a maximal value on a particle size distribution diagram obtained by a particle size distribution analysis (diagram obtained by plotting particle size as abscissa and volume-based relative particle amount as ordinate). The maximal value is preferably 5 μm or less, more preferably 3 μm or less, even more preferably 2 μm or less, especially preferably 1.8 μm or less, and is usually 0.1 μm or larger, preferably 0.5 μm or larger, more preferably 0.8 μm or larger. In cases when the particle size is not larger than the upper limit, the seed crystals are satisfactorily deposited on the base and it is easy to form a zeolite membrane having few defects. In cases when the particle size is not less than the lower limit, the seed crystals are less apt to dissolve away during the synthesis and it is easy to form a zeolite membrane having few defects.

There are no particular limitations on the particle size distribution of the seed crystals. It is, however, desirable that the particle size distribution analysis should give a cumulative distribution diagram (volume basis; cumulation from smaller-size particles) in which the diameter D50 that gives a height of 50% is usually 0.5 μm or larger, preferably 1.0 μm or larger, and is preferably 5.0 μm or less, more preferably 4.0 μm or less, even more preferably 3.0 μm or less, especially preferably 2.0 μm or less.

The proportion of seed crystals each having a size in the range of 0.5-20 times the mean pore size of the support is usually 5% or higher, preferably 15% or higher, more preferably 25% or higher, and is usually 100% or less, preferably 90% or less, more preferably 80% or less. In cases when the proportion thereof is within that range, the seed crystals are satisfactorily deposited on the base and a dense zeolite membrane having high performance can be synthesized.

By thus controlling the particle size of the seed crystals, the seed crystals deposited on the base can be made to be in a controlled state, thereby forming a dense membrane having few defects.

In order to prepare seed crystals having a preferred size, crystals of a commercial FAU type zeolite, FAU type zeolite obtained by synthesis, or ion-exchanged FAU type zeolite may be pulverized with a mortar, ball mill, jet mill, or the like.

As a method for adding the seed crystals, it is preferred to use, for example, a method in which the seed crystals are adhered beforehand to a support. This previous adhesion of the seed crystals to a support facilitates the formation of a dense zeolite membrane having satisfactory separation performance.

Methods for adhering the seed crystals to a support are not particularly limited. For example, use can be made of: a dipping method in which the seed crystals are dispersed in a medium, e.g., water, and the support is immersed in the resulting dispersion to adhere the seed crystals thereto; or a method in which the seed crystals are mixed with a medium, e.g., water, to obtain a slurry and this slurry is applied to the support. The dipping method is desirable from the standpoints of controlling the amount of the seed crystals to be adhered and producing the zeolite membrane composite with satisfactory reproducibility.

The dispersion medium in which the seed crystals are dispersed is not particularly limited. However, water is especially preferred. A water-soluble substance such as hydrochloric acid, sodium hydroxide, or potassium hydroxide may be added thereto according to need to regulate the pH of the dispersion. In the case of regulating the pH, it is desirable to adjust the pH of the dispersion to a value which is usually 7.5 or higher, preferably 8 or higher, and is usually 14 or less, preferably 12 or less. In cases when the pH of the dispersion is regulated so as to be within that range, it is easy to adhere the seed crystals in an amount within a preferred range.

The amount of the seed crystals to be dispersed is not particularly limited, and is usually 0.01% by mass or larger, preferably 0.1% by mass or larger, more preferably 0.5% by mass or larger, based on the overall mass of the dispersion. Meanwhile, the amount thereof is usually 20% by mass or less, preferably 10% by mass or less, more preferably 5% by mass or less, even more preferably 4% by mass or less, especially preferably 3% by mass or less.

In case where the amount of the seed crystals dispersed is too small, the amount of the seed crystals which adhere to the support is too small and, hence, there is a possibility that the support surface might partly include portions where zeolite formation does not occur during the hydrothermal synthesis, resulting in a membrane having defects. The amount of the seed crystals which are adhered to the support by the dipping method is substantially constant when the amount of the seed crystals in the dispersion is not less than a certain degree. Consequently, too large seed crystal amounts in the dispersion result in an increased waste of seed crystals and are disadvantageous from the standpoint of cost.

The amount of the seed crystals to be adhered to a support beforehand is not particularly limited. The amount thereof, in terms of mass per $m^2$ of the base, is usually 0.01 g or larger, preferably 0.1 g or larger, and is usually 100 g or less, preferably 50 g or less, more preferably 10 g or less, even more preferably 5 g or less, especially preferably 3 g or less, most preferably 1 g or less.

In cases when the amount of the seed crystals is not less than the lower limit, crystals are apt to be formed and membrane growth is satisfactory and apt to be even. Meanwhile, in cases when the amount of the seed crystals is not larger than the upper limit, the surface irregularities are less apt to be enhanced by the seed crystals and the growth of spontaneous nuclei due to seed crystals which have shed from the support is less apt to occur, rendering the membrane growth on the support less apt to be inhibited. Consequently, in cases when the seed crystal amount is within that range, a dense zeolite membrane tends to grow.

In the case of forming a zeolite membrane on a support by hydrothermal synthesis, there are no particular limitations on methods for fixing the support, and the support may be placed in any state, such as, for example, vertical placement or horizontal placement. In this case, a zeolite membrane may be formed by a stationary method, or a zeolite membrane may be formed while stirring the aqueous reaction mixture.

The temperature during the formation of a zeolite membrane is not particularly limited. However, the temperature is usually 80° C. or higher, preferably 100° C. or higher, more preferably 140° C. or higher, and is usually 200° C. or lower, preferably 190° C. or lower. Too low reaction temperatures may result in cases where no zeolite is yielded. Meanwhile, too high reaction temperatures may result in cases where a zeolite of a type different from that of the zeolite according to the invention is yielded.

The heating period is not particularly limited. However, the heating period is usually 1 hour or longer, preferably 5 hours or longer, more preferably 10 hours or longer, and is usually 10 days or less, preferably 5 days or less, more preferably 3 days or less, even more preferably 2 days or less. Too short reaction periods may result in cases where zeolite crystallization does not occur. Too long reaction periods may result in cases where a zeolite of a type different from that of the zeolite according to the invention is yielded.

The pressure during the zeolite membrane formation is not particularly limited, and the spontaneous pressure which results when the aqueous reaction mixture placed in a sealed vessel is heated to a temperature within that range suffices. According to need, an inert gas such as nitrogen may be added.

The porous support-zeolite membrane composite obtained by the hydrothermal synthesis is rinsed with water and then dried by a heat treatment. The term "heat treatment" herein means an operation in which heat is applied to the porous support-zeolite membrane composite to dry the composite.

The temperature in the heat treatment, in the case of performing the heat treatment for the purpose of drying, is usually 50° C. or higher, preferably 80° C. or higher, more preferably 100° C. or higher, and is usually 200° C. or lower, preferably 150° C. or lower. The heating period, in the case of performing the heat treatment for the purpose of drying, is not particularly limited so long as the zeolite membrane sufficiently dries in the period. The heating period is preferably 0.5 hours or longer, more preferably 1 hour or longer. There is no particular upper limit thereon, and the heating period is usually 100 hours or less, preferably 10 hours or less, more preferably 5 hours or less.

The temperature in the heat treatment, in the case of performing the heat treatment for the purpose of burning the organic template, is usually 350° C. or higher, preferably 400° C. or higher, more preferably 430° C. or higher, even more preferably 480° C. or higher, and is usually 900° C. or lower, preferably 850° C. or lower, more preferably 800° C. or lower, especially preferably 750° C. or lower.

The heating period, in the case of performing the heat treatment for the purpose of burning the organic template, is not particularly limited so long as the organic template is burned in the period. The heating period is preferably 0.5 hours or longer, more preferably 1 hour or longer. There is no particular upper limit thereon, and the heating period is usually 200 hours or less, preferably 150 hours or less, more preferably 100 hours or less.

The zeolite membrane may be subjected to ion exchange according to need. Examples of ions with which the zeolite membrane may be ion-exchanged include proton, alkali metal ions such as $Na^+$, $K^+$, and $Li^+$, alkaline earth metal ions such as $Ca^{2+}$, $Mg^{2+}$, $Sr^{2+}$, and $Ba^{2+}$, and ions of transition metals such as Fe, Cu, and Zn. Preferred of these are alkali metal ions such as $Na^+$, $K^+$, and $Li^+$.

The ion exchange may be conducted, for example, by a method in which the zeolite membrane which has undergone the heat treatment is treated with an aqueous solution containing an ammonium salt such as $NH_4NO_3$ or $NaNO_3$ or containing an ion with which the zeolite membrane is ion-exchanged, at a temperature of usually from room temperature to 100° C. and then rinsed with water.

The zeolite membrane may be subjected to a silylation treatment with a silylating agent according to need. Examples of the silylating agent to be used in the silylation treatment include alkoxysilanes such as tetramethoxysilane, tetraethoxysilane, tetrapropoxysilane, tetraisopropoxysilane, and tetrabutoxysilane and silicate oligomers such as methyl silicate oligomers and ethyl silicate oligomers. Preferred of these are tetraethoxysilane and methyl silicate oligomers.

Examples of the silylation treatment include: a method in which the zeolite membrane which has undergone the heat treatment is immersed in a solution containing a silylating agent, heated at a temperature of from room temperature to usually 150° C., preferably 100° C., and then rinsed with water to thereby obtain a silylated zeolite membrane; and a method in which a silylating agent is applied to the zeolite membrane which has undergone the heat treatment and this zeolite membrane is heated in the presence of water vapor at a temperature of usually from room temperature to 150° C. to thereby obtain a silylated zeolite membrane.

As described above, in the invention, an FAU type zeolite is used as seed crystals and hydrothermal synthesis is conducted in the presence of the seed crystals, thereby forming a CHA type zeolite membrane.

It is preferable in the invention that between the CHA type zeolite membrane and the support, there should be substantially no zeolite membrane of any other structure. However, the zeolite membrane composite may have a zeolite membrane of another structure on the CHA type zeolite membrane.

In the CHA type zeolite membrane formed by the process of the invention and in the zeolite membrane of each of the zeolite membrane composite 1 and zeolite membrane composite 2 described above, the $SiO_2/Al_2O_3$ molar ratio as determined by SEM-EDX is usually 5 or higher, preferably 6 or higher, and is usually 15 or less, preferably 12 or less, more preferably 10 or less, even more preferably less than 10, especially preferably 9 or less.

In cases when the $SiO_2/Al_2O_3$ molar ratio of each of these zeolite membranes is within that range, this zeolite membrane is excellent in terms of not only hydrophilicity but also acid resistance and water resistance and is suitable also for the separation of lower alcohols or substances which react with acid sites.

The $SiO_2/Al_2O_3$ molar ratio herein is a value obtained through an SEM-EDX measurement made from the membrane surface side of the zeolite membrane composite. A specific method for the measurement will be described in detail in the Examples given later (SEM-EDX Measurement (membrane surface side)).

The CHA type zeolite membrane composite thus obtained and the zeolite membrane composite 1 or the zeolite membrane composite 2 (hereinafter, these composites are often inclusively referred to as "zeolite membrane composite of the invention") each have an air permeation rate $[L/(m^2 \cdot h)]$ of usually 1,400 $L/(m^2 \cdot h)$ or less, desirably 1,000 $L/(m^2 \cdot h)$ or less, preferably 700 $L/(m^2 \cdot h)$ or less, more preferably 600 $L/(m^2 \cdot h)$ or less, even more preferably 500 $L/(m^2 \cdot h)$ or less, especially preferably 300 $L/(m^2 \cdot h)$ or less, most preferably 200 $L/(m^2 \cdot h)$ or less. There is no particular lower limit on the permeation rate, but the permeation rate is usually 0 $L/(m^2 \cdot h)$ or higher.

The air permeation rate herein is the rate of air permeation $[L/(m^2 \cdot h)]$ through the zeolite membrane composite connected to a vacuum line having an absolute pressure of 5 kPa, as will be described in Examples.

The zeolite composite membrane of the invention is suitable for use as a means for membrane separation in separation methods.

(Separation Method)

The separation method of the invention is characterized by bringing a gas or liquid mixture (preferably, a gas or liquid mixture containing one or more organic substances) into contact with the porous support-zeolite membrane composite to make a highly permeative substance pass through the composite and to thereby separate the highly permeative substance from the mixture.

In the separation method of the invention, the gas or liquid mixture is brought into contact with either the support-side surface or the zeolite-membrane-side surface of the inorganic porous support equipped with a zeolite membrane, and the opposite side is regulated so as to have a lower pressure than on the side where the mixture is in contact. A substance which is highly permeative through the zeolite membrane (a relatively highly permeative substance in the mixture) is thereby selectively passed through the composite, i.e., passed as a main component of substances which pass through the composite. Thus, a highly permeative substance can be separated from the mixture. As a result, the concentration of a specific substance (a relatively less permeative substance in the mixture) in the mixture is heightened, making it possible to separate/recover or to concentrate the specific substance.

For example, in the case of a mixture of water and an organic substance, water is separated from the mixture since water usually is highly permeative through the zeolite membrane, and the organic substance is concentrated in the original mixture. The separation/concentration method called a pervaporation method or vapor permeation method is an embodiment of the separation method of the invention.

In cases when the porous support-zeolite membrane composite is used as a separation membrane, this separation membrane has a practically sufficient throughput and makes it possible to perform membrane separation with sufficient separation performance.

The term "sufficient throughput" means that the permeation flux of a substance which passes through the membrane is preferably 1 $kg/(m^2 \cdot h)$ or higher. The term "sufficient separation performance" means that the separation factor represented by the following equation is preferably 100 or higher or that the concentration of the main component in the penetrant liquid is 95% by mass or higher.

Separation factor=$(P\alpha/P\beta)/(F\alpha/F\beta)$

[In the equation, $P\alpha$ indicates the concentration, in % by mass, of the main component in the penetrant liquid; $P\beta$ indicates the concentration, in % by mass, of the minor component in the penetrant liquid; $F\alpha$ indicates the concentration, in % by mass, of a component in the mixture to be separated, the component being the main component in the penetrant liquid; and $F\beta$ indicates the concentration, in % by mass, of a component in the mixture to be separated, the component being the minor component in the penetrant liquid.]

More specifically, in the case where, for example, a 2-propanol/water mixture having a water content of 10% by mass is passed at 70° C. under a pressure difference of 1 atm ($1.01 \times 10^5$ Pa), the permeation flux is usually 1 $kg/(m^2 \cdot h)$ or higher, preferably 3 $kg/(m^2 \cdot h)$ or higher, more preferably 5 $kg/(m^2 \cdot h)$ or higher. There is no particular upper limit on the permeation flux, and the permeation flux is usually 20 $kg/(m^2 \cdot h)$ or less, preferably 15 $kg/(m^2 \cdot h)$ or less.

The high permeability can be expressed also in terms of permeance. Permeance is a value obtained by dividing the amount of the substance which passes through by the product of the membrane area, the time period, and the partial-pressure difference for the substance which passes through.

In the case of expression in terms of permeance, when, for example, a 2-propanol/water mixture having a water content of 10% by mass is passed at 70° C. under a pressure difference of 1 atom ($1.01 \times 10^5$ Pa), the permeance of water is usually $3 \times 10^{-7}$ mol/($m^2 \cdot s \cdot Ps$) or higher, preferably $5 \times 10^{-7}$ mol/($m^2 \cdot s \cdot Ps$) or higher, more preferably $1 \times 10^{-4}$ mol/($m^2 \cdot s \cdot Ps$) or higher, especially preferably $2 \times 10^{-6}$ mol/($m^2 \cdot s \cdot Ps$) or higher. There is no particular upper limit on the permeance of water, but the permeance is usually $1 \times 10^{-4}$ mol/($m^2 \cdot s \cdot Ps$) or less, preferably $5 \times 10^{-6}$ mol/($m^2 \cdot s \cdot Ps$) or less.

Furthermore, the separation factor, when, for example, a 2-propanol/water mixture having a water content of 10% by mass is passed at 70° C. under a pressure difference of 1 atom ($1.01 \times 10^5$ Pa), is usually 500 or higher, preferably 700 or higher, more preferably 1,000 or higher, even more preferably 2,000 or higher. The upper limit of the separation factor is in the case where entirely water only passes through the membrane. In this case, the separation factor is infinity. However, the separation factor is preferably 10,000,000 or less, more preferably 1,000,000 or less.

Since the zeolite membrane composite of the invention is excellent also in terms of water resistance, this composite is suitable also for separating a mixture having a water content of 20% or higher. In the case where the mixture to be separated is a mixture of water and one or more organic substances (hereinafter this mixture is often referred to as "water-containing organic compound(s)"), the water content in the mixture is usually 5% by mass or higher, preferably 10% by mass or higher, more preferably 20% by mass or higher, even more preferably 30% by mass or higher, and is usually 95% by mass or less, preferably 80% by mass or less, more preferably 70% by mass or less.

In the separation method of the invention, the substance which passes through the zeolite membrane is usually water. Consequently, a decrease in water content results in a decrease in throughput, and too low water contents hence render the separation method inefficient. Meanwhile, in case where the water content is too high, an increased membrane area is required for the concentration (or in the case where the membrane is in the form of tubes, a larger number of tubes are required), resulting in a decrease in economical effect.

The water-containing organic compound(s) (a mixture of water and one or more organic compounds) may be a mixture in which the water content has been regulated by an appropriate water content regulation method. In this case, preferred values of the water content are the same as shown above. Examples of the water content regulation method include methods which themselves are known, such as distillation, pressure swing adsorption (PSA), temperature swing adsorption (TSA), and desiccant systems.

Furthermore, the organic compound(s) from which water has been separated with the porous support-zeolite membrane composite may be treated to further separate water therefrom. Thus, water is more highly separated and the water-containing organic compounds can be more highly concentrated.

Examples of the organic compounds include: carboxylic acids such as acetic acid, acrylic acid, propionic acid, formic acid, lactic acid, oxalic acid, tartaric acid, and benzoic acid; organic acids such as sulfonic acids, sulfinic acids, barbituric acid, uric acid, phenols, enols, diketone type compounds, thiophenols, imides, oximes, aromatic sulfonamides, and primary and secondary nitro compounds; alcohols such as methanol, ethanol, isopropanol (2-propanol), and allyl alcohol; ketones such as acetone and methyl isobutyl ketone; aldehydes such as acetaldehyde and formaldehyde; ethers such as dioxane and tetrahydrofuran; nitrogen-containing organic compounds (N-containing organic compounds) such as amides, e.g., dimethylformamide, dimethylacetamide, and N-methylpyrrolidone; esters such as acetic acid esters and acrylic acid esters; amino acids such as glycine, lysine, and glutamic acid; and saccharides such as glucose, galactose, and mannose.

It is preferable that the zeolite membrane composite of the invention should be applied to one or more organic compounds including at least one compound selected from among alcohols, ethers, ketones, aldehydes, and amides among those. Of these, one or more compounds including an alcohol or ketone are suitable. Preferred of those organic compounds are ones having 1-4 carbon atoms. More preferred are ones having 1-3 carbon atoms.

In particular, the zeolite membrane composite is suitable for separation of water from either methanol or ethanol, and is more suitable for separation of water from ethanol.

The zeolite membrane composite of the invention is suitable also for use in separating substances which are prone to react with acid sites. Examples of the substances prone to react with acid sites include compounds including a double bond. Examples of the double bond include a carbonyl group, allyl group, amide group, imine group, and thionyl group.

More specific examples include acetic acid, acrylic acid, propionic acid, formic acid, lactic acid, oxalic acid, tartaric acid, benzoic acid, acetone, methyl isobutyl ketone, acetaldehyde, formaldehyde, allyl alcohol, dimethylformamide, dimethylacetamide, N-methylpyrrolidone, ethyleneimine, and guanidine.

The organic compounds may be high-molecular-weight compounds capable of forming a mixture (mixture solution) with water. Examples of such high-molecular-weight compounds include the following ones having polar groups in the molecule: polyols such as poly(ethylene glycol) and poly(vinyl alcohol); polyamines; poly(sulfonic acid)s; poly(carboxylic acid)s such as poly(acrylic acid); poly(carboxylic ester)s such as poly(acrylic ester)s; modified high-molecular-weight compounds obtained by modifying polymers by graft polymerization, etc.; and high-molecular-weight copolymer compounds obtained by copolymerizing a nonpolar monomer, e.g., an olefin, with a polar monomer having a polar group, e.g., a carboxyl group.

The water-containing organic compound(s) may be a mixture of water and a polymer emulsion. The polymer emulsion is a mixture of a surfactant and a polymer, the mixture being in common use in adhesives, coating materials, etc. Examples of the polymer used in the polymer emulsion include: thermoplastic resins such as poly(vinyl acetate), poly(vinyl alcohol), acrylic resins, polyolefins, olefin/polar monomer copolymers, e.g., ethylene/vinyl alcohol copolymers, polystyrene, poly(vinyl ether)s, polyamides, polyesters, and cellulose derivatives; thermosetting resins such as urea resins, phenolic resins, epoxy resins, and polyurethanes; and rubbers such as natural rubber, polyisoprene, polychloroprene, and butadiene copolymers, e.g., styrene/butadiene copolymers. As the surfactant, use may be made of one which itself is known.

Since the zeolite membrane composite of the invention has acid resistance, the zeolite membrane composite can be effectively utilized also in applications such as water separation from a mixture of water and an organic acid, e.g., acetic acid, and water separation for accelerating esterification reaction. Furthermore, the porous support-zeolite membrane composite of the invention has few acid sites, and can be effectively utilized also for separating substances which react with acid sites.

The separation method of the invention may be carried out by using the zeolite membrane composite of the invention to produce an adequate separation membrane module or separation device and introducing a gas or liquid mixture thereinto. The separation membrane module or separation device can be produced using members which themselves are known.

EXAMPLES

The present invention will be explained in more detail by reference to Examples, but the invention should not be construed as being limited to the following Examples unless the invention departs from the gist thereof.

In the following Examples, air permeation rate and XRD measurements were made by the following methods.
[Air Permeation Rate]

One end of a porous support-zeolite membrane composite was sealed, and the other end was connected, in a sealed state, to a vacuum line of 5 kPa. The amount of air flowing therethrough was measured with a mass flowmeter disposed between the vacuum line and the porous support-zeolite membrane composite, this amount being taken as air permeation rate [L/(m$^2$·h)]. As the mass flowmeter, use was made of Type 8300, manufactured by KOFLOC Inc., which was for N$_2$ gas and had a maximum flow rate of 500 mL/min (at 20° C. and 1 atm). When the indication on the mass flowmeter Type 8300, manufactured by KOFLOC Inc., was 10 mL/min (at 20° C. and 1 atm) or less, the measurement was made using MM-2100M, manufactured by Lintec Corp., which was for air gas and had a maximum flow rate of 20 mL/min (at 0° C. and 1 atm).
[Determination of Particle Size Distribution]

The particle size distribution of seed crystals was determined under the following conditions.

Apparatus name: laser diffraction type particle size distribution analyzer LA-500 (manufactured by Horiba Ltd.)
Measurement mode: combination of Fraunhofer diffraction theory with Mie scattering theory
Measuring range: 0.1-200 μm
Light source: He—Ne laser (632.8 nm)
Detector: ring-shaped silicon photodiode
Dispersion medium: water A dispersion for determining the particle size distribution of seed crystals was prepared by introducing water into the ultrasonic dispersion bath of the measuring apparatus and, while stirring the water with the stirrer, adding either a powder of the seed crystals or a liquid in which a powder of the seed crystals had been dispersed beforehand, to the water held in the ultrasonic dispersion bath so that when the dispersion was circulated to the flow cell, the light which had passed through the dispersion had an intensity within the proper light intensity range displayed on the apparatus. The amount of the water to be used as the dispersion medium in this preparation is usually 250 mL, and the amount of the seed crystals to be dispersed is usually 0.01 g in the case of a powder. In the case where seed crystals in a powder form were introduced, an ultrasonic wave was propagated to the dispersion for 10 minutes to disaggregate the seed crystals within the dispersion, before the dispersion was subjected to a measurement. The measurement was made in the flow mode.

[XRD Measurement]

An X-ray diffraction (XRD) measurement was conducted under the following conditions.
Apparatus name: New D8 ADVANCE, manufactured by Bruker GmbH
Optical system specification: focusing optics
   Incidence side: sealed X-ray tube (CuKα)
      Soller Slit (2.50)
      divergence slit (variable slit)
   Specimen stage: XYZ stage
   Light-receiving side: semiconductor array detector (Lynx Eye ID mode)
      Ni-filter
      Soller Slit (2.5°)
   Goniometer radius: 280 mm
Measurement Conditions:
   X-ray output (CuKα): 40 kV, 40 mA
   Scanning axis: θ/2θ
   Scanning range (2θ): 5.0-70.0°
   Measurement mode: continuous
   Reading width: 0.01°
   Counting time: 57.6 sec
   Automatic variable slit (Automatic-DS): 1 mm (irradiation width)

X-rays were caused to strike on the specimen from a direction perpendicular to the axial direction of the specimen. With respect to measuring positions, one along the height direction was regulated so that the half values of detected peaks were maximum. A measuring point along the horizontal direction was set so that small-angle peaks had maximum intensities.

[SEM-EDX Measurement (Membrane Surface Side)]

The $SiO_2/Al_2O_3$ molar ratio to be determined through a measurement made from the zeolite membrane surface side was calculated from an SEM-EDX measurement made under the following conditions.
Apparatus name:
   SEM: Hitachi; Type S-4800, FE-SEM
   EDX: EDAX Genesis Conditions for X-Ray Intensity Measurement:
   Accelerating voltage: 10 kV; analysis depth was about 2 μm from the surface.
   WD: 15 mm Electron beam irradiation method: The whole field of view (25 μm×18 μm) of the membrane surface at a magnification of 5,000 diameters is scanned to measure intensity ratios between an SiKα line and an AlKα line. This intensity ratio measurement is made beforehand for arbitrarily selected five portions.

Determination method: Briquettes produced from zeolite powders having known makeups (L type and β type; manufactured by Tosho Corp.) were used as references to draw a calibration curve beforehand. The SiKα/AlKα intensity ratios were converted to $SiO_2/Al_2O_3$ molar ratios. A mean value for the analytical results for the arbitrarily selected five portions was employed.

[EDS Line Profile Examination]

The $SiO_2/Al_2O_3$ molar ratio X of the portion of a zeolite membrane which was located in the vicinity of the interface between the support and the zeolite membrane and the $SiO_2/Al_2O_3$ molar ratio Y of the inner portion of the zeolite membrane were calculated from a line profile determined through an SEM-EDX measurement.

The zeolite membrane composite was cut into an appropriate size, and a cross-section thereof was smoothened by irradiation with Ar ion beams using a cross-section polisher. The cross-section thus produced was subjected to an SEM-EDX measurement at a magnification of 1,000-5,000 diameters to acquire a spectrum for each of points located at intervals of 0.1 μm on a perpendicular straight line extending from the zeolite membrane surface side toward the support side.

Apparatus Name:
   SEM: Carl Zeiss; Ultra55
   EDX: Bruker; Quantax200
   Accelerating voltage: 6 kV
   WD: 7 mm
   Detector: XFlash 4010

The spectral intensities were subjected to a ZAF correction to calculate semi-quantitative values of Si and Al. The semi-quantitative values obtained were plotted against the distance as abscissa, thereby obtaining an EDS line profile. $SiO_2/Al_2O_3$ molar ratios were obtained from this EDS line profile.

X is a mean value of the $SiO_2/Al_2O_3$ molar ratios for the region which lay from the interface between the zeolite membrane and the support to a distance of 2 μm therefrom toward the surface of the zeolite membrane, and Y is a mean value of the $SiO_2/Al_2O_3$ molar ratios for the region which lay from the plane located at a distance of 2 μm from the interface between the zeolite membrane and the support toward the zeolite membrane surface to the surface of the zeolite membrane.

[Water Vapor Diffusion Measurement]

A zeolite membrane composite was cut into a strip shape (15-mm long, 4-mm wide) to obtain five specimens. These specimens were placed in a measuring cell made of stainless steel.

Pipelines (upstream-side and downstream-side pipelines) serving as gas channels have been connected to the measuring cell. A downstream-side portion of the measuring cell has been connected to a differential evacuation pump. There is a mass spectrometer somewhere in the channel between the measuring cell and the differential evacuation pump so that some of the gas discharged from the measuring cell is introduced into the mass spectrometer without flowing into the differential evacuation pump.

Helium gas was introduced into the measuring cell to make the inside of the cell a helium atmosphere. Thereafter, differential evacuation was conducted while continuing helium gas introduction, thereby depressurizing the inside of the measuring cell to about 80 kPa and removing adsorbed water, etc. from the specimens at 140° C. After having been held for 1 hour, the specimens were kept in contact with the vapor of an ethanol/water mixture liquid (water concentration, 0.2% by weight) for 1 hour. After the 1-hour contact, the inside of the measuring cell was made to be a helium atmosphere and differential evacuation was then conducted while continuing helium gas introduction, thereby depressurizing the inside of the measuring cell to about 80 kPa. During this depressurization, the behavior of the water being introduced into the mass spectrometer (AGS-7000, manufactured by Canon Anelva Corp.) was examined to thereby obtain detection intensities of the desorbed water.

The point of time when the detection intensity of the desorbed water had a maximum value was taken as 0 minute, and the time period required for the detection intensity of the desorbed water to drop to 1/20 the maximum value was expressed by Q (minutes).

Example 1

The following mixture was prepared as an aqueous reaction mixture for hydrothermal synthesis.

To 2.15 g of aluminum hydroxide (containing 53.5% by mass $Al_2O_3$; manufactured by Aldrich Co.) were added 63.0 g of 1 mol/L aqueous KOH solution and 61.8 g of water. The ingredients were mixed together by stirring to dissolve the solid and obtain a solution.

Thereto was added 13.5 g of colloidal silica (Snowtex 40, manufactured by Nissan Chemical Industries, Ltd.). This mixture was stirred for 2 hours to obtain an aqueous reaction mixture.

This aqueous reaction mixture had the following makeup (molar ratios): $SiO_2/Al_2O_3/KOH/H_2O=1/0.125/0.7/80$ and $SiO_2/Al_2O_3=8$.

As an inorganic porous support, use was made of one obtained by cutting a porous alumina tube (outer diameter, 12 mm; inner diameter, 9 mm) into a length of 80 mm, subsequently cleaning the cut tube with an ultrasonic cleaner, and then drying the cleaned tube.

A mixture of 10.0 g of a Y type zeolite in the proton form (HY (SAR=5), manufactured by Catalysts & Chemicals Industries Co., Ltd.) with 5.00 g of NaOH and 100 g of water was heated at 100° C. for 7 days. Thereafter, the zeolite was taken out by filtration, rinsed with water, and dried, thereby obtaining an FAU type zeolite. This FAU type zeolite was examined for particle size distribution. As a result, the particle size distribution thereof was found to have a D50 of 1.73 μm and maximal values of 1.32 μm and 2.98 μm (particle size: about 2 μm). This FAU type zeolite was used as seed crystals.

The support was immersed, for a given time period, in a dispersion obtained by dispersing the seed crystals in water so as to result in a concentration of 2% by mass. Thereafter, the support was dried at 100° C. for 5 hours or longer to adhere the seed crystals thereto. The mass of the seed crystals thus adhered was 3 g/m².

The support to which the seed crystals had been adhered was vertically placed in an inner cylinder (200 mL) made of Teflon (registered trademark) and was thereby immersed in the aqueous reaction mixture held in the inner cylinder. The autoclave was closed, and the temperature was raised from room temperature to 180° C. over 5 hours. After completion of the temperature rising, the contents were heated at 180° C. for 24 hours in a stationary state under a spontaneous pressure, thereby performing hydrothermal synthesis. After the lapse of the given time period, the contents were allowed to cool, and the resultant porous support-zeolite membrane composite was taken out of the aqueous reaction mixture, cleaned, and then dried at 100° C. for 4 hours.

The porous support-zeolite membrane composite which had been dried had an air permeation rate of 9 L/(m²·h). The $SiO_2/Al_2O_3$ molar ratio thereof was determined through an SEM-EDX measurement (membrane surface side) made from the zeolite membrane surface side and, as a result, was found to be 6.4. From an XRD measurement of the porous support-zeolite membrane composite, it was ascertained that a CHA type zeolite membrane had been yielded. This XRD pattern is shown in FIG. 2.

Example 2

The same aqueous reaction mixture, inorganic porous support, and seed crystals as in Example 1 were used.

The support was immersed, for a given time period, in a dispersion obtained by dispersing the seed crystals in water so as to result in a concentration of 2% by mass. Thereafter, the support was dried at 100° C. for 5 hours or longer to adhere the seed crystals thereto. As a result, the mass of the seed crystals adhered was 2 g/m².

The support to which the seed crystals had been adhered was immersed in the aqueous reaction mixture and the temperature was raised, in the same manner as in Example 1. A porous support-zeolite membrane composite was then obtained in the same manner as in Example 1, except that after completion of the temperature rising, the contents were heated at 180° C. for 18 hours in a stationary state under a spontaneous pressure.

The porous support-zeolite membrane composite which had been dried had an air permeation rate of 0 L/(m²·h). The $SiO_2/Al_2O_3$ molar ratio thereof was determined through an SEM-EDX measurement (membrane surface side) made from the zeolite membrane surface side and, as a result, was found to be 6.4.

The ratio of the $SiO_2/Al_2O_3$ molar ratio X in the portion of the zeolite membrane which was located in the vicinity of the interface between the support and the zeolite membrane to the $SiO_2/Al_2O_3$ molar ratio Y in the inner portion of the zeolite membrane, X/Y, was 0.90. In the water vapor diffusion measurement, the time period Q (minutes) required for the detection intensity of desorbed water to decrease from a maximum value to 1/20 thereof was 16.7 minutes.

Example 3

The same aqueous reaction mixture and seed crystals as in Example 1 were used.

As an inorganic porous support, use was made of one obtained by cutting a porous alumina tube (outer diameter, 16 mm; inner diameter, 12 mm) into a length of 80 mm, subsequently cleaning the cut tube with an ultrasonic cleaner, and then drying the cleaned tube.

The support was immersed, for a given time period, in a dispersion obtained by dispersing the seed crystals in water so as to result in a concentration of 2% by mass. Thereafter, the support was dried at 100° C. for 5 hours or longer to adhere the seed crystals thereto. The mass of the seed crystals thus adhered was 0.3 g/m².

The subsequent procedure was conducted in the same manner as in Example 1 to obtain a porous support-zeolite membrane composite.

The porous support-zeolite membrane composite which had been dried had an air permeation rate of 39 L/(m²·h).

The $SiO_2/Al_2O_3$ molar ratio thereof was determined through an SEM-EDX measurement (membrane surface side) made from the zeolite membrane surface side and, as a result, was found to be 6.0. From an XRD measurement of the porous support-zeolite membrane composite, it was ascertained that a CHA type zeolite membrane had been yielded.

The zeolite membrane was examined for thickness with an SEM. As a result, it was ascertained that a membrane having a thickness of about 10 μm had been yielded.

The ratio of the $SiO_2/Al_2O_3$ molar ratio X in the portion of the zeolite membrane which was located in the vicinity of the interface between the support and the zeolite membrane to the $SiO_2/Al_2O_3$ molar ratio Y in the inner portion of the zeolite membrane, X/Y, was 0.87. In the water vapor diffusion measurement, the time period Q (minutes) required for the detection intensity of desorbed water to decrease from a maximum value to 1/20 thereof was 15.2 minutes.

Example 4

The following mixture was prepared as an aqueous reaction mixture for hydrothermal synthesis.

To 11.8 g of aluminum hydroxide (containing 53.5% by mass $Al_2O_3$; manufactured by Aldrich Co.) was added a mixture of 346 g of 1 mol/L aqueous KOH solution and 340 g of water. The ingredients were stirred to dissolve the solid and obtain a solution. Thereto was added 74.25 g of colloidal silica (Snowtex 40, manufactured by Nissan Chemical Industries, Ltd.). This mixture was stirred for 2 hours to obtain an aqueous reaction mixture.

This aqueous reaction mixture had the following makeup (molar ratios): $SiO_2/Al_2O_3/KOH/H_2O=1/0.125/0.7/80$ and $SiO_2/Al_2O_3=8$.

As an inorganic porous support, use was made of one obtained by cutting a porous alumina tube (outer diameter, 16 mm; inner diameter, 12 mm) into a length of 400 mm and then subjecting the cut tube to air blowing. The same seed crystals as in Example 1 were used.

The support was immersed, for a given time period, in a dispersion obtained by dispersing the seed crystals in water so as to result in a concentration of 0.5% by mass. Thereafter, the support was dried at 100° C. for 5 hours or longer to adhere the seed crystals thereto. The mass of the seed crystals thus adhered was 2 g/m².

The support to which the seed crystals had been adhered was vertically placed in an inner cylinder (800 mL) made of Teflon (registered trademark) and was thereby immersed in the aqueous reaction mixture held in the inner cylinder. The autoclave was closed, and the temperature was raised from room temperature to 180° C. over 5 hours. After completion of the temperature rising, the contents were heated at 180° C. for 24 hours in a stationary state under a spontaneous pressure, thereby performing hydrothermal synthesis. After the lapse of the given time period, the contents were allowed to cool, and the resultant porous support-zeolite membrane composite was taken out of the reaction mixture, cleaned, and then dried at 100° C. for 4 hours.

The porous support-zeolite membrane composite which had been dried had an air permeation rate of 10 L/(m²·h).

From an XRD measurement of the porous support-zeolite membrane composite, it was ascertained that a CHA type zeolite membrane had been yielded.

The zeolite membrane was examined for thickness with an SEM. As a result, it was ascertained that a membrane having a thickness of about 20 μm had been yielded.

Example 5

The same aqueous reaction mixture, inorganic porous support, and seed crystals as in Example 1 were used.

The support was immersed, for a given time period, in a dispersion obtained by dispersing the seed crystals in water so as to result in a concentration of 2% by mass. Thereafter, the support was dried at 100° C. for 5 hours or longer to adhere the seed crystals thereto. The mass of the seed crystals adhered was 2 g/m².

The subsequent procedure was conducted in the same manner as in Example 1 to obtain a porous support-zeolite membrane composite.

The porous support-zeolite membrane composite which had been dried had an air permeation rate of 0 L/(m²·h).

From an XRD measurement of the porous support-zeolite membrane composite, it was ascertained that a CHA type zeolite membrane had been yielded.

The porous support-zeolite membrane composite which had been dried was coated with a methyl silicate oligomer (MKC (registered trademark) Silicate, manufactured by Mitsubishi Chemical Corp.) as a silylating agent to conduct a silylation treatment. This composite was heated at 100° C. for 6 hours in the presence of water vapor.

Example 6

The same aqueous reaction mixture, inorganic porous support, and seed crystals as in Example 1 were used.

The support was immersed, for a given time period, in a dispersion obtained by dispersing the seed crystals in water so as to result in a concentration of 2% by mass. Thereafter, the support was dried at 100° C. for 5 hours or longer to adhere the seed crystals thereto. The mass of the seed crystals adhered was 2 g/m².

The subsequent procedure was conducted in the same manner as in Example 1 to obtain a porous support-zeolite membrane composite.

The porous support-zeolite membrane composite which had been dried had an air permeation rate of 0 L/(m²·h).

From an XRD measurement of the porous support-zeolite membrane composite, it was ascertained that a CHA type zeolite membrane had been yielded.

The ratio of the $SiO_2/Al_2O_3$ molar ratio X in the portion of the zeolite membrane which was located in the vicinity of the interface between the support and the zeolite membrane to the $SiO_2/Al_2O_3$ molar ratio Y in the inner portion of the zeolite membrane, X/Y, was 1.04. In the water vapor diffusion measurement, the time period Q (minutes) required for the detection intensity of desorbed water to decrease from a maximum value to 1/20 thereof was 14.1 minute.

Example 7

The same aqueous reaction mixture, inorganic porous support, and seed crystals as in Example 1 were used to obtain a porous support-zeolite membrane composite.

The seed crystals were used in the form of a 0.5% by mass dispersion in water. The porous support was immersed therein for a given time period and then dried at 100° C. for 5 hours or longer to adhere the seed crystals thereto. As a result, the mass of the seed crystals adhered was 0.9 g/m$^2$.

The porous support-zeolite membrane composite which had been dried had an air permeation rate of 120 L/(m$^2$·h).

The ratio of the SiO$_2$/Al$_2$O$_3$ molar ratio X in the portion of the zeolite membrane which was located in the vicinity of the interface between the support and the zeolite membrane to the SiO$_2$/Al$_2$O$_3$ molar ratio Y in the inner portion of the zeolite membrane, X/Y, was 0.86. In the water vapor diffusion measurement, the time period Q (minutes) required for the detection intensity of desorbed water to decrease from a maximum value to 1/20 thereof was 13.8 minute.

Comparative Example 1

The same aqueous reaction mixture and inorganic porous support as in Example 1 were used.

As seed crystals was used a CHA type zeolite. The CHA type zeolite had been obtained by mixing 10.0 g of a Y type zeolite in the proton form (HY (SAR=5), manufactured by Catalysts & Chemicals Industries Co., Ltd.), with 5.00 g of KOH and 100 g of water, heating the mixture at 100° C. for 6 days, and then subjecting the resultant zeolite to filtration, water rinsing, and drying.

The support was immersed, for a given time period, in a dispersion obtained by dispersing the seed crystals in water so as to result in a concentration of 2% by mass. Thereafter, the support was dried at 100° C. for 5 hours or longer to adhere the seed crystals thereto. The mass of the seed crystals thus adhered was 3 g/m$^2$.

Thereafter, the support to which the seed crystals had been adhered was immersed in the aqueous reaction mixture and the temperature was raised from room temperature to 180° C. over 5 hours, in the same manner as in Example 1. A porous support-zeolite membrane composite was then obtained in the same manner as in Example 1, except that after completion of the temperature rising, the contents were heated at 180° C. for 18 hours in a stationary state under a spontaneous pressure.

The zeolite membrane composite which had been dried had an air permeation rate of 0 L/(m$^2$·h).

The SiO$_2$/Al$_2$O$_3$ molar ratio thereof was determined through an SEM-EDX measurement (membrane surface side) made from the zeolite membrane surface side and, as a result, was found to be 6.2.

Comparative Example 2

The same aqueous reaction mixture and inorganic porous support as in Example 1 were used.

A CHA type zeolite (particle size: about 0.5 μm) obtained by subjecting a mixture having a gel makeup (molar ratio) of SiO$_2$/Al$_2$O$_3$/NaOH/H$_2$O/TMADAOH=1/0.033/0.1/40/0.1 to two-day hydrothermal synthesis at 160° C. and subjecting the resultant crystals to filtration, water rinsing, and drying was used as seed crystals. (TMADAOH: N,N,N-trimethyl-1-adamantanammonium hydroxide)

The support was immersed, for a given time period, in a dispersion obtained by dispersing the seed crystals in water so as to result in a concentration of 1% by mass. Thereafter, the support was dried at 100° C. for 5 hours or longer to adhere the seed crystals thereto. The mass of the seed crystals thus adhered was 1 g/m$^2$.

The support to which the seed crystals had been adhered was vertically placed in an inner cylinder (200 mL) made of Teflon (registered trademark) and was thereby immersed in the aqueous reaction mixture held in the inner cylinder. The autoclave was closed, and the contents were heated at 180° C. for 48 hours in a stationary state under a spontaneous pressure. After the lapse of the given time period, the contents were allowed to cool, and the resultant porous support-zeolite membrane composite was taken out of the reaction mixture, cleaned, and then dried at 100° C. for 4 hours.

The porous support-zeolite membrane composite which had been dried had an air permeation rate of 926 L/(m$^2$·h). The SiO$_2$/Al$_2$O$_3$ molar ratio thereof was determined through an SEM-EDX measurement (membrane surface side) made from the zeolite membrane surface side and, as a result, was found to be 6.0.

Although a longer synthesis period had been used as compared with Example 1, the membrane had a high air permeation rate and was not dense.

Comparative Example 3

The following mixture was prepared as a reaction mixture for hydrothermal synthesis.

To 2.86 g of aluminum hydroxide (containing 53.5% by mass Al$_2$O$_3$; manufactured by Aldrich Co.) was added a mixture of 63.0 g of 1 mol/L aqueous KOH solution and 62.0 g of water. The ingredients were stirred to dissolve the solid and obtain a solution. Thereto was added 13.5 g of colloidal silica (Snowtex 40, manufactured by Nissan Chemical Industries, Ltd.). This mixture was stirred for 2 hours to obtain an aqueous reaction mixture.

This reaction mixture had the following makeup (molar ratios): SiO$_2$/Al$_2$O$_3$/KOH/H$_2$O=1/0.167/0.7/80 and SiO$_2$/Al$_2$O$_3$=6.

The same inorganic porous support as in Example 1 was used.

As seed crystals, use was made of a CHA type zeolite obtained by subjecting a mixture having a gel makeup (molar ratio) of SiO$_2$/Al$_2$O$_3$/NaOH/H$_2$O/TMADAOH=1/0.033/0.1/40/0.1 to two-day hydrothermal synthesis at 160° C. and subjecting the resultant crystals to filtration, water rinsing, and drying. The seed crystals had a particle size of about 1 μm.

The support was immersed, for a given time period, in a dispersion obtained by dispersing the seed crystals in water so as to result in a concentration of 1% by mass. Thereafter, the support was dried at 100° C. for 5 hours or longer to adhere the seed crystals thereto. The mass of the seed crystals thus adhered was 2 g/m$^2$.

Thereafter, the support to which the seed crystals had been adhered was immersed in the aqueous reaction mixture in the same manner as in Comparative Example 2. A porous support-zeolite membrane composite was then obtained in the same manner as in Comparative Example 2, except that the contents were heated at 140° C. for 120 hours in a stationary state under a spontaneous pressure.

The porous support-zeolite membrane composite which had been dried had an air permeation rate of 0 L/(m$^2$·h). The zeolite membrane was examined for thickness with an SEM. As a result, it was ascertained that a membrane having a thickness of about 5 μm had been yielded. The SiO$_2$/Al$_2$O$_3$ molar ratio thereof was determined through an SEM-EDX measurement (membrane surface side) made from the zeolite membrane surface side and, as a result, was found to be 6.0.

The ratio of the SiO$_2$/Al$_2$O$_3$ molar ratio X in the portion of the zeolite membrane which was located in the vicinity of the interface between the support and the zeolite membrane to the SiO$_2$/Al$_2$O$_3$ molar ratio Y in the inner portion of the zeolite membrane, X/Y, was 1.42.

Comparative Example 4

The following mixture was prepared as a reaction mixture for hydrothermal synthesis.

To 0.881 g of aluminum hydroxide (containing 53.5% by mass Al$_2$O$_3$; manufactured by Aldrich Co.) was added a mixture of 10.5 g of 1 mol/L aqueous NaOH solution, 7.00 g of 1 mol/L aqueous KOH solution, and 100 g of water. The ingredients were stirred to dissolve the solid and obtain a solution.

Thereto was added 2.37 g of an aqueous TMADAOH solution (containing 25% by mass TMADAOH; manufactured by Sachem Inc.) as an organic template, followed by 10.5 g of colloidal silica (Snowtex 40, manufactured by Nissan Chemical Industries, Ltd.). This mixture was stirred for 2 hours to obtain an aqueous reaction mixture.

This reaction mixture had the following makeup (molar ratios): $SiO_2/Al_2O_3/NaOH/KOH/TMADAOH/H_2O = 1/0.066/0.15/0.10/0.04/100$ and $SiO_2/Al_2O_3 = 15$.

The same inorganic porous support as in Example 1 was used.

As seed crystals, use was made of ones obtained in the same manner as in Comparative Example 3 (the seed crystals had a particle size of about 0.5 μm).

The support was immersed, for a given time period, in a dispersion obtained by dispersing the seed crystals in water so as to result in a concentration of 0.3% by mass. Thereafter, the support was dried at 100° C. for 5 hours or longer to adhere the seed crystals thereto. The mass of the seed crystals thus adhered was 1 g/m².

Thereafter, the support to which the seed crystals had been adhered was immersed in the aqueous reaction mixture in the same manner as in Comparative Example 2.

A porous support-zeolite membrane composite was then obtained in the same manner as in Comparative Example 2, except that the contents were heated at 160° C. for 48 hours in a stationary state under a spontaneous pressure.

The zeolite membrane composite obtained through the hydrothermal synthesis was burned in an electric furnace at 500° C. for 5 hours. The zeolite membrane composite which had been burned had an air permeation rate of 41 L/(m²·h).

The zeolite membrane which had been burned was subjected to a silylation treatment in the same manner as in Example 5.

Comparative Example 5

A porous support-zeolite membrane composite was obtained in the same manner as in Comparative Example 1, except that after the support to which the seed crystals had been adhered was immersed in the aqueous reaction mixture, hydrothermal synthesis was performed at 140° C. for a period of 168 hours.

The zeolite membrane composite which had been dried had an air permeation rate of 0 L/(m²·h).

The ratio of the $SiO_2/Al_2O_3$ molar ratio X in the portion of the zeolite membrane which was located in the vicinity of the interface between the support and the zeolite membrane to the $SiO_2/Al_2O_3$ molar ratio Y in the inner portion of the zeolite membrane, X/Y, was 0.69. In the water vapor diffusion measurement, the time period Q (minutes) required for the detection intensity of desorbed water to decrease from a maximum value to 1/20 thereof was 30.6 minutes.

Comparative Example 6

A zeolite membrane composite was obtained in the same manner as in Comparative Example 4, except that the zeolite membrane which had been burned was not subjected to a silylation treatment. The zeolite membrane composite which had been burned had an air permeation rate of 65 L/(m²·h). The $SiO_2/Al_2O_3$ molar ratio thereof was determined through an SEM-EDX measurement (membrane surface side) made from the zeolite membrane surface side and, as a result, was found to be 17. In the water vapor diffusion measurement, the time period Q (minutes) required for the detection intensity of desorbed water to decrease from a maximum value to 1/20 thereof was 7.0 minutes.

The results obtained in the Examples and Comparative Examples given above are summarized respectively in Table 1 and Table 2.

TABLE 1

|  | Example 1 | Example 2 | Example 3 | Example 4 | Example 5 | Example 6 | Example 7 |
|---|---|---|---|---|---|---|---|
| Seed crystals | FAU | FAU | FAU | FAU | FAU | FAU | FAU |
| Mass of adhered seed crystals (g/m²) | 3 | 2 | 0.3 | 2 | 2 | 2 | 0.9 |
| Period of hydrothermal synthesis (h) | 24 | 18 | 24 | 24 | 24 | 24 | 24 |
| Temperature in hydrothermal synthesis (° C.) | 180 | 180 | 180 | 180 | 180 | 180 | 180 |
| Air permeation rate (L/(m²/h)) | 9 | 0 | 39 | 10 | 0 | 0 | 120 |
| SAR (surface) | 6.4 | 6.4 | 6.0 | — | — | — | — |
| X/Y | — | 0.90 | 0.87 | — | — | 1.04 | 0.86 |
| Q (min) | — | 16.7 | 15.2 | — | — | 14.1 | 13.8 |

TABLE 2

|  | Comparative Example 1 | Comparative Example 2 | Comparative Example 3 | Comparative Example 4 | Comparative Example 5 | Comparative Example 6 |
|---|---|---|---|---|---|---|
| Seed crystals | CHA | CHA | CHA | CHA | CHA | CHA |
| Mass of adhered seed crystals (g/m²) | 3 | 1 | 2 | 1 | 3 | 1 |

TABLE 2-continued

|  | Comparative Example 1 | Comparative Example 2 | Comparative Example 3 | Comparative Example 4 | Comparative Example 5 | Comparative Example 6 |
|---|---|---|---|---|---|---|
| Period of hydrothermal synthesis (h) | 18 | 48 | 120 | 48 | 168 | 48 |
| Temperature in hydrothermal synthesis (° C.) | 180 | 180 | 140 | 160 | 140 | 160 |
| Air permeation rate (L/(m$^2$/h)) | 0 | 926 | 0 | 41 | 0 | 65 |
| SAR (surface) | 6.2 | 6.0 | 6.0 | — | — | 17 |
| X/Y | — | — | 1.42 | — | 0.69 | — |
| Q (min) | — | — | — | — | 30.6 | 7.0 |

Test Example 1

The porous support-zeolite membrane composite obtained in Example 1 was used to perform a separation in which water was selectively passed and separated from a water/2-propanol aqueous solution (10/90% by mass) of 70° C. by a pervaporation method.

A diagrammatic view of the apparatus used in the pervaporation method is shown in FIG. 1. In FIG. 1, the inside of the porous support-zeolite membrane composite 5 has been depressurized with a vacuum pump 9 so that the difference in pressure between the inside and the outer side of the composite where the liquid 4 to be separated is in contact is about 1 atm (1.01×10$^5$ Pa). Due to this pressure difference, the permeative substance (water) in the liquid 4 to be separated infiltrates into or vaporizes in the porous support-zeolite membrane composite 5 and passes therethrough. The substance which has passed is collected by a trap 7 for penetrant liquid collection. Meanwhile, the organic compound in the liquid 4 to be separated stagnates on the outer side of the porous support-zeolite membrane composite 5.

As a result, the porous support-zeolite membrane composite showed a permeation flux of 4.6 kg/(m$^2$·h) and a separation factor of 3,400, and the penetrant liquid had a water concentration of 99.75% by mass. The separation performance was 3.7×10$^{-6}$ mol/(m$^2$·s·Pa) in terms of water permeance.

Test Example 2

The porous support-zeolite membrane composite obtained in Example 2 was used to perform a separation in which water was selectively passed and separated from a water/2-propanol aqueous solution (10/90% by mass) of 70° C.

The composite showed a permeation flux of 5.8 kg/(m$^2$·h) and a separation factor of 1,300, and the penetrant liquid had a water concentration of 99.32% by mass. The separation performance was 4.7×10$^{-6}$ mol/(m$^2$·s·Pa) in terms of water permeance.

Test Example 3

The porous support-zeolite membrane composite obtained in Example 3 was used to perform a separation in which water was selectively passed and separated from a water/2-propanol aqueous solution (10/90% by mass) of 70° C.

The composite showed a permeation flux of 4.4 kg/(m$^2$·h) and a separation factor of 2,200, and the penetrant liquid had a water concentration of 99.60% by mass. The separation performance was 3.6×10 mol/(m$^2$·s·Pa) in terms of water permeance.

Test Example 4

The porous support-zeolite membrane composite obtained in Example 5 was used to perform a separation in which water was selectively passed and separated from a water/ethanol aqueous solution (5/95% by mass) of 60° C. by a pervaporation method in the same manner as in Test Example 1.

As a result, the porous support-zeolite membrane composite showed a permeation flux of 0.72 kg/(m$^2$·h) and a separation factor of 10,200, and the penetrant liquid had a water concentration of 99.81% by mass. The separation performance was 2.1×10$^{-6}$ mol/(m$^2$·s·Pa) in terms of water permeance.

Test Example 5

The porous support-zeolite membrane composite obtained in Example 5 was used to perform a separation in which water was selectively passed and separated from a water/2-propanol aqueous solution (10/90% by mass) of 70° C. by a pervaporation method in the same manner as in Test Example 1.

As a result, the porous support-zeolite membrane composite showed a permeation flux of 4.1 kg/(m$^2$·h) and a separation factor of 9,700, and the penetrant liquid had a water concentration of 99.91% by mass. The separation performance was 3.3×10$^{-6}$ mol/(m$^2$·s·Pa) in terms of water permeance.

Test Example 6

The porous support-zeolite membrane composite obtained in Example 5 was used to perform a separation in which water was selectively passed and separated from a water/allyl alcohol aqueous solution (10/90% by mass) of 80° C.

The composite showed a permeation flux of 3.3 kg/(m²·h) and a separation factor of 4,100, and the penetrant liquid had a water concentration 99.75% by mass.

Test Example 7

The porous support-zeolite membrane composite obtained in Example 5 was used to perform a separation in which water was selectively passed and separated from a water/methanol aqueous solution (30/70% by mass) of 50° C. by a pervaporation method in the same manner as in Test Example 1.

As a result, the porous support-zeolite membrane composite showed a permeation flux of 1.0 kg/(m²·h) and a separation factor of 37, and the penetrant liquid had a water concentration of 94.28% by mass. The separation performance was $2.3 \times 10^{-6}$ mol/(m²·s·Pa) in terms of water permeance.

Test Example 8

A porous support-zeolite membrane composite produced in the same manner as in Example 4 was used to perform a separation in which water was selectively passed and separated from a water/allyl alcohol aqueous solution (10/90% by mass) of 80° C.

The composite showed a permeation flux of 3.6 kg/(m²·h) and a separation factor of 7,400, and the penetrant liquid had a water concentration 99.85% by mass.

Test Example 9

The porous support-zeolite membrane composite obtained in Example 6 was used to perform a separation in which water was selectively passed and separated from a water/2-propanol aqueous solution (10/90% by mass) of 70° C.

The composite showed a permeation flux of 5.4 kg/(m²·h) and a separation factor of 5,300, and the penetrant liquid had a water concentration 99.83% by mass. The separation performance was $4.4 \times 10^{-6}$ mol/(m²·s·Pa) in terms of water permeance.

Test Example 10

The porous support-zeolite membrane composite obtained in Example 7 was used to perform a separation in which water was selectively passed and separated from a water/ethanol aqueous solution (5/95% by mass) of 60° C. by a pervaporation method in the same manner as in Test Example 1.

As a result, the porous support-zeolite membrane composite showed a permeation flux of 1.53 kg/(m²·h) and a separation factor of 1,200, and the penetrant liquid had a water concentration of 98.49% by mass. The separation performance was $4.6 \times 10^{-6}$ mol/(m²·s·Pa) in terms of water permeance.

Comparative Test Example 1

The porous support-zeolite membrane composite obtained in Comparative Example 1 was used to perform a separation in which water was selectively passed and separated from a water/2-propanol aqueous solution (10/90% by mass) of 70° C. by a pervaporation method in the same manner as in Test Example 1.

The composite showed a permeation flux of 2.8 kg/(m²·h) and a separation factor of 98, and the penetrant liquid had a water concentration of 92.45% by mass. The separation performance was $2.0 \times 10^{-6}$ mol/(m²·s·Pa) in terms of water permeance. Both the permeation flux and the separation factor were low.

Comparative Test Example 2

The porous support-zeolite membrane composite obtained in Comparative Example 3 was used to perform a separation in which water was selectively passed and separated from a water/2-propanol aqueous solution (10/90% by mass) of 70° C. by a pervaporation method in the same manner as in Test Example 1.

The composite showed a permeation flux of 2.0 kg/(m²·h) and a separation factor of 1,700, and the penetrant liquid had a water concentration of 99.54% by mass. The separation performance was $1.5 \times 10^{-6}$ mol/(m²·s·Pa) in terms of water permeance. The membrane obtained in Comparative Example 3 was low in both separation factor and permeation flux, although a prolonged synthesis period had been used therefor.

Comparative Test Example 3

The porous support-zeolite membrane composite obtained in Comparative Example 4 was used to perform a separation in which water was selectively passed and separated from a water/methanol aqueous solution (30/70% by mass) of 50° C. by a pervaporation method in the same manner as in Test Example 1.

The composite showed a permeation flux of 0.9 kg/(m²·h) and a separation factor of 4, and the penetrant liquid had a water concentration of 63.19% by mass. The separation performance was $1.3 \times 10^{-6}$ mol/(m²·s·Pa) in terms of water permeance. Both the permeation flux and the separation factor were considerably low.

Comparative Test Example 4

The porous support-zeolite membrane composite obtained in Comparative Example 4 was used to perform a separation in which water was selectively passed and separated from a water/allyl alcohol aqueous solution (10/90% by mass) of 80° C. by a pervaporation method in the same manner as in Test Example 1.

The composite showed a permeation flux of 1.6 kg/(m²·h) and a separation factor of 4,800, and the penetrant liquid had a water concentration of 99.79% by mass.

The permeation rate was low as compared with Test Example 6.

The Test Examples and Comparative Test Examples are summarized in Tables 3 to 6 below.

TABLE 3

| | Water/2-propanol (10/90% by mass) 70° C. | | | | | | |
|---|---|---|---|---|---|---|---|
| | Test Example 1 | Test Example 2 | Test Example 3 | Test Example 5 | Test Example 9 | Comparative Test Example 1 | Comparative Test Example 2 |
| Zeolite membrane composite | Example 1 | Example 2 | Example 3 | Example 5 | Example 6 | Comparative Example 1 | Comparative Example 3 |

TABLE 3-continued

Water/2-propanol (10/90% by mass) 70° C.

| | Test Example 1 | Test Example 2 | Test Example 3 | Test Example 5 | Test Example 9 | Compartive Test Example 1 | Compartive Test Example 2 |
|---|---|---|---|---|---|---|---|
| Permeation flux [kg/(m²h)] | 4.6 | 5.8 | 4.4 | 4.1 | 5.4 | 2.8 | 2.0 |
| Separation factor | 3400 | 1300 | 2200 | 9700 | 5300 | 98 | 1700 |
| Water concentration in penetrant liquid (mass %) | 99.75 | 99.32 | 99.60 | 99.91 | 99.83 | 92.45 | 99.54 |
| Permeance [mol/(m²sPs)] | $3.7 \times 10^{-6}$ | $4.7 \times 10^{-6}$ | $3.6 \times 10^{-6}$ | $3.3 \times 10^{-6}$ | $4.4 \times 10^{-6}$ | $2.0 \times 10^{-6}$ | $1.5 \times 10^{-6}$ |

TABLE 4

Water/ethanol (5/95% by mass) 60° C.

| | Test Example 4 | Test Example 10 |
|---|---|---|
| Zeolite membrane composite | Example 5 | Example 7 |
| Permeation flux [kg/(m²h)] | 0.72 | 1.53 |
| Separation factor | 10200 | 1200 |
| Water concentration in penetrant liquid (mass %) | 99.81 | 98.49 |
| Permeance [mol/(m²sPs)] | $2.1 \times 10^{-6}$ | $4.6 \times 10^{-6}$ |

TABLE 5

Water/allyl alcohol (10/90% by mass) 80° C.

| | Test Example 6 | Test Example 8 | Comparative Test Example 4 |
|---|---|---|---|
| Zeolite membrane composite | Example 5 | Example 4 | Comparative Example 4 |
| Permeation flux [kg/(m²h)] | 3.3 | 3.6 | 1.6 |
| Separation factor | 4100 | 7400 | 4800 |
| Water concentration in penetrant liquid (mass %) | 99.75 | 99.85 | 99.79 |

TABLE 6

Water/methanol (30/70% by mass) 50° C.

| | Test Example 7 | Comparative Test Example 3 |
|---|---|---|
| Zeolite membrane composite | Example 5 | Comparative Example 4 |
| Permeation flux [kg/(m²h)] | 1.0 | 0.9 |
| Separation factor | 37 | 4 |
| Water concentration in penetrant liquid (mass %) | 94.28 | 63.19 |
| Permeance [mol/(m²sPs)] | $2.3 \times 10^{-6}$ | $1.3 \times 10^{-6}$ |

While the invention has been described in detail and with reference to specific embodiments thereof, it will be apparent to one skilled in the art that various changes and modifications can be made therein without departing from the spirit and scope thereof. This application is based on a Japanese patent application filed on Apr. 18, 2014 (Application No. 2014-086677), the contents thereof being incorporated herein by reference.

DESCRIPTION OF THE REFERENCE NUMERALS

1. Stirrer
2. Water bath
3. Stir bar
4. Liquid to be separated
5. Porous support-zeolite membrane composite
6. Pirani gauge
7. Trap for penetrant liquid collection
8. Cold trap
9. Vacuum pump

The invention claimed is:

1. A process for producing a porous support-zeolite membrane composite, which comprises forming a CHA type zeolite membrane on a porous support by a hydrothermal synthesis in the presence of seed crystals, wherein
an FAU type zeolite is used as the seed crystals, and
the seed crystals are adhered beforehand to the porous support and the CHA type zeolite membrane is formed.

2. The process for producing a porous support-zeolite membrane composite according to claim 1, wherein
the hydrothermal synthesis is conducted in an aqueous reaction mixture comprising an Si element source and water, and
the Si element source is an amorphous substance or an alkoxysilane.

3. The process for producing a porous support-zeolite membrane composite according to claim 1, wherein the seed crystals have an $SiO_2/Al_2O_3$ molar ratio of less than 15.

4. The process for producing a porous support-zeolite membrane composite according to claim 1, wherein the CHA type zeolite membrane formed has an $SiO_2/Al_2O_3$ molar ratio of 15 or less.

5. A porous support-zeolite membrane composite produced by the process for production according to claim 1.

* * * * *